US011252956B2

(12) United States Patent
Blair et al.

(10) Patent No.: US 11,252,956 B2
(45) Date of Patent: *Feb. 22, 2022

(54) APPARATUS TO PRESERVE AND IDENTIFY BIOLOGICAL SAMPLES AT CRYOGENIC CONDITIONS

(71) Applicant: TMRW LIFE SCIENCES, INC., New York, NY (US)

(72) Inventors: William Alan Blair, San Diego, CA (US); Timothy Alan Sharp, Farmingdale, NY (US)

(73) Assignee: TMRW Life Sciences, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,718

(22) Filed: Apr. 6, 2020

(65) Prior Publication Data

US 2020/0229428 A1 Jul. 23, 2020

Related U.S. Application Data

(63) Continuation of application No. 16/593,062, filed on Oct. 4, 2019, now Pat. No. 10,973,226.
(Continued)

(51) Int. Cl.
*A01N 1/02* (2006.01)
*B01L 3/00* (2006.01)
(Continued)

(52) U.S. Cl.
CPC .......... *A01N 1/0263* (2013.01); *B01L 3/5082* (2013.01); *B01L 3/50851* (2013.01);
(Continued)

(58) Field of Classification Search
CPC ... A01N 1/0263; A01N 1/0268; B01L 3/5082; B01L 3/50851; B01L 2300/0645;
(Continued)

(56) References Cited

U.S. PATENT DOCUMENTS 4,573,581 A 3/1986 Galloway et al.
5,355,684 A 10/1994 Guice
(Continued)

FOREIGN PATENT DOCUMENTS

AU 2011357590 B2 9/2015
AU 2017287017 A1 1/2019
(Continued)

OTHER PUBLICATIONS

Swedberg, Claire , "Hitachi Chemical Markets Tiny UHF Tag", https://www.rfidjournal.com/hitachi-chemical-markets-tiny-uhf-tag, Sep. 12, 2010, 4 pages.
(Continued)

*Primary Examiner* — Liban M Hassan
(74) *Attorney, Agent, or Firm* — Cozen O'Connor

(57) ABSTRACT

A container includes a vial, cap, and one or more wireless transponders secured to the cap, the vial or a jacket to store and identify samples of biological material at cryogenic temperatures (e.g., vitrified biological samples), for instance held by cryopreservation storage devices. A specimen holder may be extend from the cap. The vial and/or cap includes ports or vents. A carrier includes a box, thermal shunt, thermal insulation to store and identify arrays of containers that hold cryopreservation storage devices with samples of biological material at cryogenic temperatures. Various apparatus include wireless transponders positioned and oriented to enhance range, and allow interrogation while retained in a carrier. Various apparatus can maintain the biological material at or close to cryogenic temperatures for prolonged period of times after being removed from a cryogenic cooler, and can allow wireless inventorying while maintaining the biological samples at suitably cold temperatures.

26 Claims, 20 Drawing Sheets

Related U.S. Application Data

(60) Provisional application No. 62/741,986, filed on Oct. 5, 2018, provisional application No. 62/741,998, filed on Oct. 5, 2018, provisional application No. 62/879,160, filed on Jul. 26, 2019, provisional application No. 62/880,786, filed on Jul. 31, 2019, provisional application No. 62/900,281, filed on Sep. 13, 2019.

(51) Int. Cl.
  *G01K 13/00* (2021.01)
  *G01N 1/42* (2006.01)
  *G01N 21/03* (2006.01)

(52) U.S. Cl.
  CPC ............ *G01K 13/006* (2013.01); *G01N 1/42* (2013.01); *G01N 21/0332* (2013.01); *B01L 2200/147* (2013.01); *B01L 2300/021* (2013.01); *B01L 2300/0645* (2013.01); *B01L 2300/1883* (2013.01); *B01L 2300/1894* (2013.01)

(58) Field of Classification Search
  CPC ....... B01L 2200/147; B01L 2300/1883; B01L 2300/021; B01L 2300/1894; B01L 3/5029; B01L 9/06; B01L 2300/022; B01L 2300/042; B01L 2300/048; B01L 3/508; B01L 7/50; G01K 13/006; G01N 1/42; G01N 21/0332
  See application file for complete search history.

(56) References Cited

U.S. PATENT DOCUMENTS

| | | | |
|---|---|---|---|
| 5,545,562 A | 8/1996 | Cassou et al. | |
| 5,741,462 A | 4/1998 | Nova et al. | |
| 5,751,629 A | 5/1998 | Nova et al. | |
| 5,874,214 A | 2/1999 | Nova et al. | |
| 5,925,562 A | 7/1999 | Nova et al. | |
| 6,100,026 A | 8/2000 | Nova et al. | |
| 6,141,975 A * | 11/2000 | Tatsumi | B01L 7/00 62/3.2 |
| 6,156,566 A | 12/2000 | Bryant | |
| 6,329,139 B1 | 12/2001 | Nova et al. | |
| 6,564,120 B1 | 5/2003 | Richard et al. | |
| 7,070,053 B1 | 7/2006 | Abrams et al. | |
| 7,091,864 B2 | 8/2006 | Veitch et al. | |
| 7,278,328 B2 | 10/2007 | Massaro | |
| 7,350,703 B2 | 4/2008 | Ambartsoumian | |
| 7,411,508 B2 | 8/2008 | Harazin et al. | |
| 7,661,591 B2 | 2/2010 | Dearing et al. | |
| 7,870,748 B2 * | 1/2011 | Byrne | B01L 9/06 62/62 |
| 8,097,199 B2 | 1/2012 | Abbott et al. | |
| 8,098,162 B2 | 1/2012 | Abbott et al. | |
| 8,115,599 B2 | 2/2012 | Harazin et al. | |
| 8,378,827 B2 | 2/2013 | Davidowitz et al. | |
| 8,502,645 B2 | 8/2013 | Thomas et al. | |
| 8,710,958 B2 | 4/2014 | Yang et al. | |
| 8,852,536 B2 | 10/2014 | Davidowitz et al. | |
| 8,872,627 B2 | 10/2014 | Davidowitz | |
| 8,884,743 B2 | 11/2014 | Chaffey et al. | |
| 8,937,550 B2 | 1/2015 | Phaneuf et al. | |
| 9,028,754 B2 | 5/2015 | Winter et al. | |
| 9,163,869 B2 | 10/2015 | Warhurst et al. | |
| 9,211,540 B2 | 12/2015 | Lansdowne | |
| 9,418,265 B2 | 8/2016 | Morris et al. | |
| 9,431,692 B2 | 8/2016 | Davidowitz et al. | |
| 9,501,734 B2 | 11/2016 | Morris | |
| 9,516,876 B2 | 12/2016 | Inoue | |
| 9,547,782 B2 | 1/2017 | Lansdowne | |
| 9,589,225 B2 | 3/2017 | Morris | |
| 9,619,678 B2 | 4/2017 | Morris et al. | |
| 9,697,457 B2 | 7/2017 | Morris | |
| 9,723,832 B2 | 8/2017 | Camenisch et al. | |
| 9,736,890 B2 | 8/2017 | Chaffey et al. | |
| 9,764,325 B2 | 9/2017 | Davidowitz | |
| 9,796,574 B2 | 10/2017 | Frey et al. | |
| 9,928,457 B2 | 3/2018 | McDowell | |
| 10,207,270 B2 | 2/2019 | Lansdowne | |
| 10,328,431 B2 | 6/2019 | Davidowitz | |
| 10,401,082 B2 | 9/2019 | Coradetti et al. | |
| 10,561,141 B2 | 2/2020 | Suzuki et al. | |
| 10,748,050 B2 | 8/2020 | Morris et al. | |
| 2002/0190845 A1 | 12/2002 | Moore | |
| 2002/0196146 A1 | 12/2002 | Moore | |
| 2003/0174046 A1 | 9/2003 | Abrams | |
| 2004/0100415 A1 | 5/2004 | Veitch et al. | |
| 2005/0237195 A1 | 10/2005 | Urban | |
| 2005/0247782 A1 | 11/2005 | Ambartsoumian | |
| 2006/0051239 A1 | 3/2006 | Massaro | |
| 2006/0283945 A1 | 12/2006 | Excoffier et al. | |
| 2007/0068208 A1 | 3/2007 | Norman et al. | |
| 2008/0012687 A1 | 1/2008 | Rubinstein | |
| 2008/0121700 A1 | 5/2008 | Dearing et al. | |
| 2008/0239478 A1 | 10/2008 | Tafas et al. | |
| 2009/0015430 A1 | 1/2009 | Harazin et al. | |
| 2009/0026907 A1 | 1/2009 | Davidowitz et al. | |
| 2009/0318751 A1 | 12/2009 | Lansdowne | |
| 2010/0028214 A1 | 2/2010 | Howard et al. | |
| 2010/0302040 A1 | 12/2010 | Davidowitz et al. | |
| 2011/0137812 A1 | 6/2011 | Sherga | |
| 2011/0143452 A1 | 6/2011 | Che et al. | |
| 2011/0181875 A1 | 7/2011 | Nakahana et al. | |
| 2011/0199187 A1 | 8/2011 | Davidowitz | |
| 2011/0199188 A1 | 8/2011 | Dickson | |
| 2011/0308271 A1 | 12/2011 | Schryver | |
| 2011/0312102 A1 * | 12/2011 | Jo | G01N 21/6458 436/164 |
| 2012/0060514 A1 | 3/2012 | Warhurst et al. | |
| 2012/0060520 A1 | 3/2012 | Collins et al. | |
| 2012/0060539 A1 | 3/2012 | Hunt et al. | |
| 2012/0060541 A1 | 3/2012 | Hunt et al. | |
| 2012/0064603 A1 | 3/2012 | Childs et al. | |
| 2012/0256806 A1 | 10/2012 | Davidowitz et al. | |
| 2012/0272500 A1 | 11/2012 | Reuteler | |
| 2012/0293338 A1 | 11/2012 | Chaffey et al. | |
| 2013/0011226 A1 | 1/2013 | Camenisch et al. | |
| 2013/0048711 A1 | 2/2013 | Burns et al. | |
| 2013/0076215 A1 | 3/2013 | Davidowitz et al. | |
| 2013/0106579 A1 | 5/2013 | Aubert et al. | |
| 2013/0119562 A1 | 5/2013 | Shimizu et al. | |
| 2013/0151004 A1 | 6/2013 | Winter et al. | |
| 2013/0152710 A1 | 6/2013 | Laugharn et al. | |
| 2013/0217107 A1 | 8/2013 | Pederson et al. | |
| 2014/0008355 A1 | 1/2014 | Chaffey et al. | |
| 2014/0157798 A1 | 6/2014 | Jimenez-Rios et al. | |
| 2014/0171829 A1 | 6/2014 | Holmes et al. | |
| 2014/0230472 A1 | 8/2014 | Coradetti et al. | |
| 2014/0352456 A1 | 12/2014 | Davidowitz | |
| 2015/0045782 A1 | 2/2015 | Ottanelli | |
| 2015/0122887 A1 | 5/2015 | Morris et al. | |
| 2015/0125574 A1 | 5/2015 | Arent et al. | |
| 2015/0204598 A1 | 7/2015 | Affleck et al. | |
| 2015/0205986 A1 | 7/2015 | Morris et al. | |
| 2015/0273468 A1 | 10/2015 | Croquette et al. | |
| 2015/0356398 A1 | 12/2015 | Morris | |
| 2015/0379390 A1 | 12/2015 | Morris | |
| 2016/0026911 A1 | 1/2016 | Morris et al. | |
| 2016/0095309 A1 | 4/2016 | Reuteler | |
| 2016/0175837 A1 | 6/2016 | Chaffey et al. | |
| 2016/0288999 A1 | 10/2016 | Caveney et al. | |
| 2016/0289000 A1 | 10/2016 | Caveney et al. | |
| 2016/0349172 A1 | 12/2016 | Houghton et al. | |
| 2016/0353730 A1 * | 12/2016 | Harston | A61D 19/022 |
| 2016/0358062 A1 | 12/2016 | Morris | |
| 2017/0113909 A1 | 4/2017 | Frey et al. | |
| 2017/0122846 A1 * | 5/2017 | Holmes | G01N 1/38 |
| 2017/0184479 A1 | 6/2017 | Schryver et al. | |
| 2017/0320054 A1 | 11/2017 | Crum et al. | |
| 2018/0020659 A1 | 1/2018 | Camenisch et al. | |
| 2018/0043364 A1 | 2/2018 | Davidowitz | |

(56) References Cited

U.S. PATENT DOCUMENTS

| | | | |
|---|---|---|---|
| 2018/0100868 A1 | 4/2018 | Grimwood et al. |
| 2018/0135806 A1 | 5/2018 | Qu et al. |
| 2018/0202908 A1 | 7/2018 | Croquette et al. |
| 2018/0368394 A1 | 12/2018 | Kjelland et al. |
| 2019/0000073 A1 | 1/2019 | Pedersen et al. |
| 2019/0060892 A1 | 2/2019 | Davidowitz et al. |
| 2019/0193078 A1 | 6/2019 | Fiondella et al. |
| 2019/0250181 A1 | 8/2019 | Seeber |
| 2019/0276233 A1 | 9/2019 | Caveney et al. |
| 2019/0293344 A1 | 9/2019 | Sun et al. |
| 2019/0297877 A1 | 10/2019 | Komatsu et al. |

FOREIGN PATENT DOCUMENTS

| | | | | |
|---|---|---|---|---|
| CA | 2972315 A1 | 8/2016 | | |
| CN | 105890965 A | 8/2016 | | |
| CN | 205815766 U | * 12/2016 | | |
| CN | 207663251 U | 7/2018 | | |
| CN | 109258627 A | 1/2019 | | |
| CN | 208425434 U | 1/2019 | | |
| CN | 110476952 A | 11/2019 | | |
| CN | 110550327 A | 12/2019 | | |
| CN | 110589332 A | 12/2019 | | |
| CN | 110645752 A | 1/2020 | | |
| CN | 210709605 U | 6/2020 | | |
| CN | 210709624 U | 6/2020 | | |
| CN | 210711515 U | 6/2020 | | |
| EP | 0706825 A1 | 4/1996 | | |
| EP | 1366998 A3 | 3/2004 | | |
| EP | 1366998 B1 | 1/2006 | | |
| EP | 1916492 A1 | 4/2008 | | |
| EP | 2315163 A1 | 4/2011 | | |
| EP | 2124171 B1 | 8/2012 | | |
| EP | 1888239 B1 | 10/2014 | | |
| EP | 1981692 B1 | 6/2015 | | |
| EP | 2498968 B1 | 9/2015 | | |
| EP | 2335182 B1 | 10/2015 | | |
| EP | 2297736 B1 | 2/2016 | | |
| EP | 2292332 B1 | 7/2016 | | |
| EP | 2614320 B1 | 10/2016 | | |
| EP | 2948247 B1 | 11/2017 | | |
| EP | 2743865 B1 | 6/2019 | | |
| EP | 2866938 B1 | 6/2019 | | |
| EP | 3539899 A1 | 9/2019 | | |
| EP | 2965266 B1 | 10/2019 | | |
| ES | 2595984 T3 | 1/2017 | | |
| JP | 5278978 B2 | 5/2013 | | |
| WO | 0194016 A1 | 12/2001 | | |
| WO | 02081743 A2 | 10/2002 | | |
| WO | 03061381 A1 | 7/2003 | | |
| WO | 2004026661 A1 | 4/2004 | | |
| WO | 2005093641 A1 | 10/2005 | | |
| WO | 2005109332 A1 | 11/2005 | | |
| WO | 2005115621 A1 | 12/2005 | | |
| WO | 2006029110 A1 | 3/2006 | | |
| WO | 2007024540 A1 | 3/2007 | | |
| WO | 2007049039 A1 | 5/2007 | | |
| WO | 2007075253 A2 | 7/2007 | | |
| WO | 2007092119 A1 | 8/2007 | | |
| WO | 2008024471 A2 | 2/2008 | | |
| WO | 2008057150 A1 | 5/2008 | | |
| WO | 2009004366 A1 | 1/2009 | | |
| WO | 2009017558 A1 | 2/2009 | | |
| WO | 2009120596 A1 | 10/2009 | | |
| WO | 2009155638 A1 | 12/2009 | | |
| WO | 2010037166 A1 | 4/2010 | | |
| WO | 2011069190 A1 | 6/2011 | | |
| WO | 2012100281 A1 | 8/2012 | | |
| WO | 2012033605 A3 | 11/2012 | | |
| WO | 2012033994 A3 | 12/2012 | | |
| WO | 2012033992 A3 | 4/2013 | | |
| WO | 2013053011 A1 | 4/2013 | | |
| WO | 2010014656 A3 | 5/2013 | | |
| WO | 2012034037 A3 | 5/2013 | | |
| WO | 2014001819 A1 | 1/2014 | | |
| WO | 2014009729 A1 | 1/2014 | | |
| WO | 2014114938 A2 | 7/2014 | | |
| WO | 2014157798 A1 | 10/2014 | | |
| WO | 2014191757 A1 | 12/2014 | | |
| WO | 2015073964 A1 | 5/2015 | | |
| WO | 2015109315 A3 | 10/2015 | | |
| WO | WO-2016120224 A1 * | 8/2016 | | ............. B01L 3/502 |
| WO | 2016200519 A1 | 12/2016 | | |
| WO | 2017075144 A1 | 5/2017 | | |
| WO | 2017109153 A1 | 6/2017 | | |
| WO | 2017215957 A1 | 12/2017 | | |
| WO | 2018000051 A1 | 1/2018 | | |
| WO | 2018002287 A1 | 1/2018 | | |
| WO | 2018025053 A1 | 2/2018 | | |
| WO | 2018039727 A1 | 3/2018 | | |
| WO | 2018041516 A1 | 3/2018 | | |
| WO | 2018097267 A1 | 5/2018 | | |
| WO | 2019005450 A1 | 1/2019 | | |
| WO | 2019182900 A1 | 9/2019 | | |

OTHER PUBLICATIONS

Comley, J., "New approaches to sample identification tracking and technologies for maintaining the quality of stored samples," Drug Discovery World Summer 2017, 11 pages.

HID Beyond Cool: RFID disentangles cryopreservation storage and management, 2015, 4 pages.

Ihmig et al., "Frozen cells and bits," IEEE Pulse, Sep. 2013, 9 pages.

FluidX Tri-Coded Jacket: 0.7ml Sample Storage Tube with External Thread; Brooks Life Sciences; https://bioinventory.biostorage.com.

International Search Report and Written Opinion for PCT/US2020/060565, dated Mar. 8, 2021, 11 pages.

"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.

"IVF Witness System: RI Witness TM ART Management System", CooperSurgical Fertility Company 2021, 24 pages.

"RI Witness—Confidence, Efficiency and Trust", CooperSurgical, Fertility and Genomic Solutions, Order No. WIT_BRO_001_V13_ROW—Oct. 13, 2020, 13 pages.

"RI Witness—Product guide", CooperSurgical Fertility and Genomic Solutions, Order No. EQU_BRO_004, V1: ROW Oct. 24, 2018, 12 pages.

Brady printer Range, "Everyone is Unique" Continual cryopreservation monitoring from RI Witness, CooperSurgical, Inc. Order No. WIT_FLY_010_V2_US Oct. 14, 2020, 3 pages.

Coopersurgical, RI Witness, Order No. CE 60010312 Version 3-ROW: Oct. 24, 2018, 12 pages.

International Preliminary Report on Patentability and Written Opinion from PCT Application No. PCT/GB2005/002048 dated Aug. 23, 2005, 9 pages.

Maggiulli, Roberta , et al., "Implementing an electronic witnessing system into a busy IVF clinic—one clinic's experience", Genera Center for Reproductive Medicine, Rome, Italy, 2 pages.

Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.

Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.

* cited by examiner

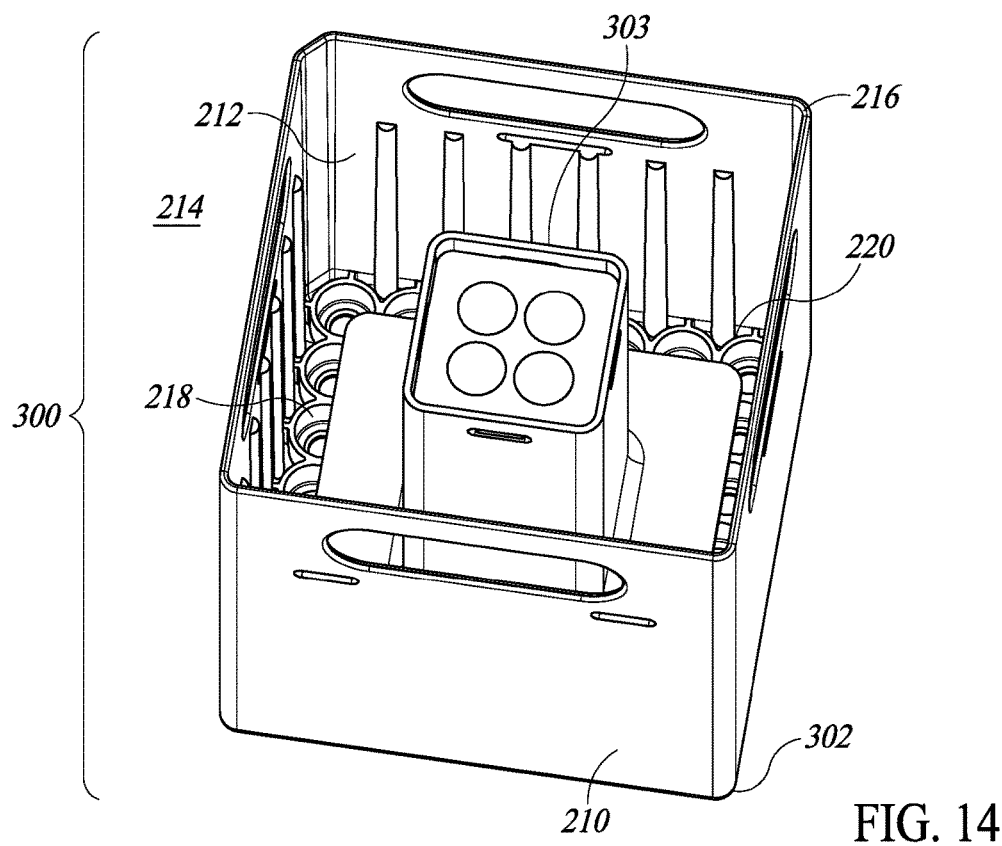
FIG. 14
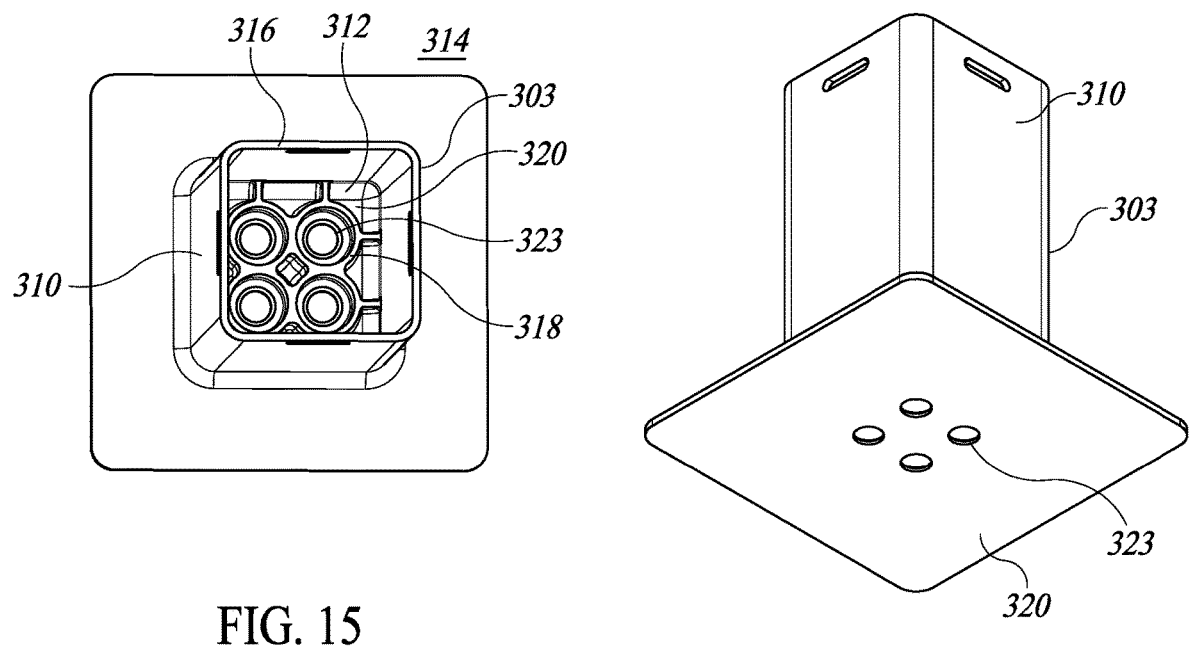
FIG. 15
FIG. 16

APPARATUS TO PRESERVE AND IDENTIFY BIOLOGICAL SAMPLES AT CRYOGENIC CONDITIONS

BACKGROUND

Technical Field

The present disclosure generally relates to apparatus to maintain at least temporarily maintain biological samples (e.g., eggs, sperm, embryos) at cryogenic temperatures, and to facilitate identification of stored biological samples.

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a storage device (e.g., a cryopreservation straw, cryopreservation tube, stick or spatula) is rapidly cooled by placing the biological sample and the storage device in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples must then be continuously stored in a liquid nitrogen dewar or other container containing the liquid nitrogen, which is at a temperature of negative 196 degrees Celsius.

There are, however, a number of concerns in how these biological samples are being stored, identified, managed, inventoried, retrieved, etc.

For example, each harvested embryo is loaded on a rigid embryo straw, stick or spatula. On the case of tube, the tube may be closed (e.g., plugged) at one end and open at the other end. The cryopreservation storage devices containing or holding the embryos are cooled as quickly as possible by plunging the cryopreservation storage device with the biological material into liquid nitrogen at a temperature of approximately negative 196 degrees Celsius, for example to achieve vitrification. More particularly, multiple cryopreservation storage devices are placed in a goblet for placement in the liquid nitrogen storage tank. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (e.g., a cryopreservation storage device number, a practitioner number, etc.).

The size of the cryopreservation storage devices and the storage conditions in liquid nitrogen generally require special labels, and even then can adversely affect the persistence of markings on the respective cryopreservation storage devices. For instance, it is not uncommon for labels bearing identification information corresponding to the individual that the embryo was harvested from to separate from the corresponding cryopreservation storage device. Even if the goblet includes the identification information, it should also be noted that cryopreservation storage devices are often separated from the corresponding goblet, thereby resulting in one or more cryopreservation storage devices floating within the liquid nitrogen storage tank.

With regard to storage and management of these biological samples, facilities employ personnel that are required to maintain the liquid nitrogen storage tanks (e.g., by refilling them with liquid nitrogen when needed) and manage the inventory of stored biological samples (e.g., by performing periodic accountings). There is, however, little recordkeeping with regard to the proper storage of these biological samples. For example, subsequent identification or otherwise handling of the vitrified biological sample can involve removal of the sample from temperature-controlled storage and exposure of the sample to ambient temperature, thus potentially risking the viability of the sample.

Accordingly, it is desirable to provide new apparatus for preserving and identifying biological samples (e.g., vitrified biological samples) at suitably cold temperatures.

BRIEF SUMMARY

A container includes a vial, cap, and wireless transponders to store and identify samples of biological material at cryogenic temperatures (e.g., vitrified biological samples), for instance held by cryopreservation storage devices (e.g., straws, tubes, sticks, spatulas). A carrier includes a box, thermal shunt, thermal insulation to store and identify arrays of containers that hold cryopreservation storage devices with samples of biological material at cryogenic temperatures. Various apparatus include wireless transponders positioned and oriented to enhance range, and allow interrogation while retained in a carrier. Various apparatus can maintain the biological material at or close to cryogenic temperatures for prolonged period of times after being removed from a cryogenic cooler, and can allow wireless inventorying while maintaining the biological samples at suitably cold temperatures.

A carrier to carry vials of biological materials and extend cryogenic conditions may be summarized as including: a container having a top, a bottom and at least one side wall, the bottom having an inner facing surface and an outer facing surface, the at least one side wall having an inner facing surface and an outer facing surface, the inner facing surface of the bottom and the inner facing surface of the at least one side wall delineating an interior compartment having an interior compartment profile, the container having an opening at the top thereof; a thermal shunt, the thermal shunt comprising a substrate comprising a metal and having a first major face and a second major face, the second major face opposed from the first major face across a thickness of the substrate, the substrate having an array of a plurality of throughholes that extend through the thickness of the substrate, each of the throughholes of the substrate shaped and sized to receive at least a portion of a respective vial therethrough, the substrate closely receivable in the interior compartment of the container; at least one thermal insulator closely receivable in the interior compartment of the container and that overlies the first major face and underlies the second major face of the substrate of thermal shunt, the at least one thermal insulator having an array of a plurality of throughholes that extend therethrough, each of the throughholes of the at least one thermal insulator the shaped and sized to receive at least a portion of a respective vial therethrough; and a spacer closely receivable in the interior compartment of the container, the spacer having an array of a plurality of throughholes that extend therethrough, each of the throughholes of the spacer the shaped and sized to receive at least a portion of a respective vial therethrough, and wherein, when the spacer, the thermal shunt, the at least one thermal insulator are stacked in the interior compartment of the container, each of the throughholes of the spacer is axially aligned with a respective one of the throughholes of the thermal shunt and is axially aligned with a respective at least one of the throughholes of the at least one thermal insulator.

The vials may each carry a respective wireless transponder, and a combination of the bottom of the container, the thermal shunt, the at least one thermal insulator and the spacer positions the vials longitudinally to space the wireless transponders relatively above or relatively below the thermal shunt by a defined distance, for example positioning the vials longitudinally to space the wireless transponders relatively above or relatively below the thermal shunt by a distance of at least 3 millimeters. A combination of any of a thickness of the bottom of the container, the thermal shunt, the at least one thermal insulator and the spacer may position the vials longitudinally to space a bottom of the vials within a defined distance of an exterior surface of the bottom, for example a distance of less than 20 mm or more preferably less than 15 mm of an exterior surface of the bottom.

The at least one thermal insulator may comprise a thermal insulator tray and a thermal insulator plate, the substrate of the thermal shunt sandwiched between the thermal insulator tray and the thermal insulator plate. The tray may have a base having a periphery and a peripheral wall that extends from and about the periphery of the base, the base having an array of a plurality of throughholes, and the thermal insulator plate may have an array of a plurality of throughholes, the throughholes of the thermal insulator tray axially aligned with respective throughholes of the thermal insulator plate and axially aligned with respective throughholes of the substrate of the thermal shunt. The thermal insulator plate may be closely receivable by the peripheral wall of the thermal insulator tray to enclose the thermal shunt on all sides thereof by a combination of the thermal insulator tray and the thermal insulator plate, preventing thermal convection therethrough. The thermal insulator may comprise or consist of an aerogel.

The thermal shunt may be a heat sink in the form of a block of non-ferrous metal. The substrate of the thermal shunt may be a heat sink, for example, in the form of a block of aluminum or other non-ferrous metal. The substrate of the thermal shunt is may be a heat sink in the form of a block of non-ferrous metal impregnated polymer.

A bottom of the container may include an array of a plurality of receptacles that extend upwardly from the inner facing surface, each of the receptacles having a dimension sized to receive a bottom portion of a respective vial therein, and when the spacer, the thermal shunt, the at least one thermal insulator are stacked in the interior compartment of the container, each of the throughholes of the spacer, the thermal shunt, and the at least one thermal insulator is axially aligned with a respective one of the receptacles. The throughholes of the spacer, the thermal shunt, and the at least one thermal insulator may be arranged in a 2 by 2 array. The throughholes of the spacer, the thermal shunt, and the at least one thermal insulator may be arranged in a 7 by 7 array.

A carrier may include a cover coupleable to the container to seal the opening in the top of the container while the spacer, the thermal shunt, the at least one thermal insulator are stacked in the interior compartment of the container. The at least one side wall of the container is a thermally insulated side wall. The carrier may further include a handle.

A carrier may include one or more of: a passive temperature sensor fixed to a portion of the carrier, the temperature sensor operable to provide a signal representative of a temperature in the interior compartment of the container; a passive wireless transponder fixed to a portion of the carrier, the wireless transponder operable to withstand temperatures of approximately negative 150° C. and to subsequently or concurrently wireless transmit a unique identifier; a machine-readable symbol fixed to a portion of the carrier and which encodes a unique identifier; and/or a human-readable symbol fixed to a portion of the carrier and which encodes information.

A container for cryogenic storage of biological materials may be summarized as including: a vial having a first end, a second end, and a side wall, the second end opposed from the first end across a length of the vial, the side wall extending between the first and the second ends to delimit an interior cavity of the vial from an exterior thereof, the vial having an opening at the first end thereof; a cap sized and shaped to removably close the opening at the first end of the vial; a first wireless transponder having a first antenna, the first antenna having a beam axis aligned with a main lobe of a radiation plot of the first antenna, the first wireless transponder fixed to the vial with the beam axis thereof extending parallel to the length of the vial, the first wireless transponder operable to withstand temperatures of approximately negative 150° C. and to wireless transmit a unique identifier; and a second wireless transponder having a second antenna, the second antenna having a beam axis aligned with a main lobe of a radiation plot of the second antenna, the second wireless transponder fixed to the vial with the beam axis thereof extending perpendicularly to the beam axis of the first antenna, the second wireless transponder operable to withstand temperatures of approximately negative 150° C. and to wireless transmit a unique identifier.

The first antenna may be fixed at least proximate the second end of the vial, for secured thereto via an epoxy or encapsulant or modeled therein.

The second end of the vial may be a flat surface, the flat surface perpendicular to the length of the vial, and the first antenna of the first wireless transponder may extend parallel with the flat surface of the bottom of the vial. The first wireless transponder may be a radio frequency identification button cell that has a pair of major surfaces opposed across a thickness of the radio frequency identification button cell from one another and which extend parallel with the flat surface of the bottom of the vial. The second wireless transponder may be a radio frequency identification tag, and the radio frequency identification tag may wrap at least partially around an outer perimeter of the side wall of the vial.

The container may be sized to store sample cryopreservation storage devices with the biological materials retained by the sample cryopreservation storage devices. The container may further include a fixed thermal mass located in the interior cavity of the vial, the fixed thermal mass having a larger thermal mass than a thermal mass associated with the sample cryopreservation storage devices and the biological materials. The fixed thermal mass may take the form of a piece of non-ferrous metal or a metal impregnated polymer. The fixed thermal mass may be located along the length of the vial spaced from both the first wireless transponder and the second wireless transponder by at least a minimum defined distance. For example, the fixed thermal mass may be located along the length of the vial spaced from both the first wireless transponder and the second wireless transponder by at least a minimum defined distance of 0.3 mm.

The container may further include at least one passive temperature sensor carried by the vial, the passive temperature sensor operable to withstand temperatures of approximately negative 150° C. and to subsequently or concurrently provide a signal representative of a temperature in the interior compartment of the container. The at least one passive temperature sensor may be integral to at least one of the first or the second wireless transponders, and the first and the second wireless transponders may each be passive radio frequency identification transponders that encode at least one unique identifier or MEMS based identification transponders.

The container may further include at least one machine-readable symbol carried by the vial, the at least one machine-readable symbol encoding a unique identifier. The at least one machine-readable symbol may be carried by one or both of the wireless transponders The wireless transponders may be fixed to a portion of the vial via an epoxy or encapsulant, or may be integrated into the vial, for instance by molding.

A container for cryogenic storage of biological materials may be summarized as comprising: a vial having a first end, a second end, and a side wall, the second end opposed from the first end across a length of the vial, the side wall extending between the first and the second ends to delimit an interior cavity of the vial from an exterior thereof, the vial having an opening at the first end thereof; a cap sized and shaped to removably close the opening at the first end of the vial, at least one of the cap or the vial including one or more through-holes to allow ingress of liquid (e.g., liquid nitrogen) into and/or to vent gas (e.g., air) from the interior cavity of the vial to the exterior while the cap is secured to the vial.

The container may include a first wireless transponder having a first antenna, the first antenna having a beam axis aligned with a main lobe of a radiation plot of the first antenna, the first wireless transponder fixed to the vial with the beam axis thereof extending parallel to the length of the vial, the first wireless transponder operable to withstand temperatures of approximately negative 150° C. and to wireless transmit a unique identifier. The through-holes may allow liquid nitrogen to fill the interior cavity of the vial when the vial is placed in a cryogenic bath, advantageously preventing the vial from floating to a surface of the liquid nitrogen bath.

A container for cryogenic storage of biological materials may be summarized as comprising: a vial having a first end, a second end, and a side wall, the second end opposed from the first end across a length of the vial, the side wall extending between the first and the second ends to delimit an interior cavity of the vial from an exterior thereof, the vial having an opening at the first end thereof; a cap sized and shaped to removably close the opening at the first end of the vial, and an elongated specimen holder having a distal end to carry a specimen and a proximate end, the elongated specimen holder attached to the cap at the proximate end of the elongated specimen holder. The elongated specimen holder may be integral with the cap, for example the elongated specimen holder and cap formed as a unitary, single piece construction (e.g., molded as a single unit), or may be secured to the cap via a friction or interference fit, or an adhesive capable of withstanding cryogenic temperatures.

A container for cryogenic storage of biological materials may be summarized as comprising: a vial having a first end, a second end, and a side wall, the second end opposed from the first end across a length of the vial, the side wall extending between the first and the second ends to delimit an interior cavity of the vial from an exterior thereof, the vial having an opening at the first end thereof; a cap sized and shaped to removably close the opening at the first end of the vial, and a jacket, sleeve or frame secured to an exterior of the vial. A wireless transponder may be carried on or by the jacket or sleeve, or frame, for example at tip thereof that is distal with respect to the cap.

A container for cryogenic storage of biological materials may be summarized as comprising: a vial having a first end, a second end, and a side wall, the second end opposed from the first end across a length of the vial, the side wall extending between the first and the second ends to delimit an interior cavity of the vial from an exterior thereof, the vial having an opening at the first end thereof; a cap sized and shaped to removably close the opening at the first end of the vial, and a wireless transponder may be carried on or by the cap.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 14 is a top isometric view of a patient carrier that can carry an array of four individual containers, according to at least one implementation.

FIG. 15 is a top isometric view of a carrier box of the patient carrier of FIG. 14, according to at least one implementation.

FIG. 16 is a bottom isometric view of a carrier box of the patient carrier of FIG. 14, according to at least one implementation.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
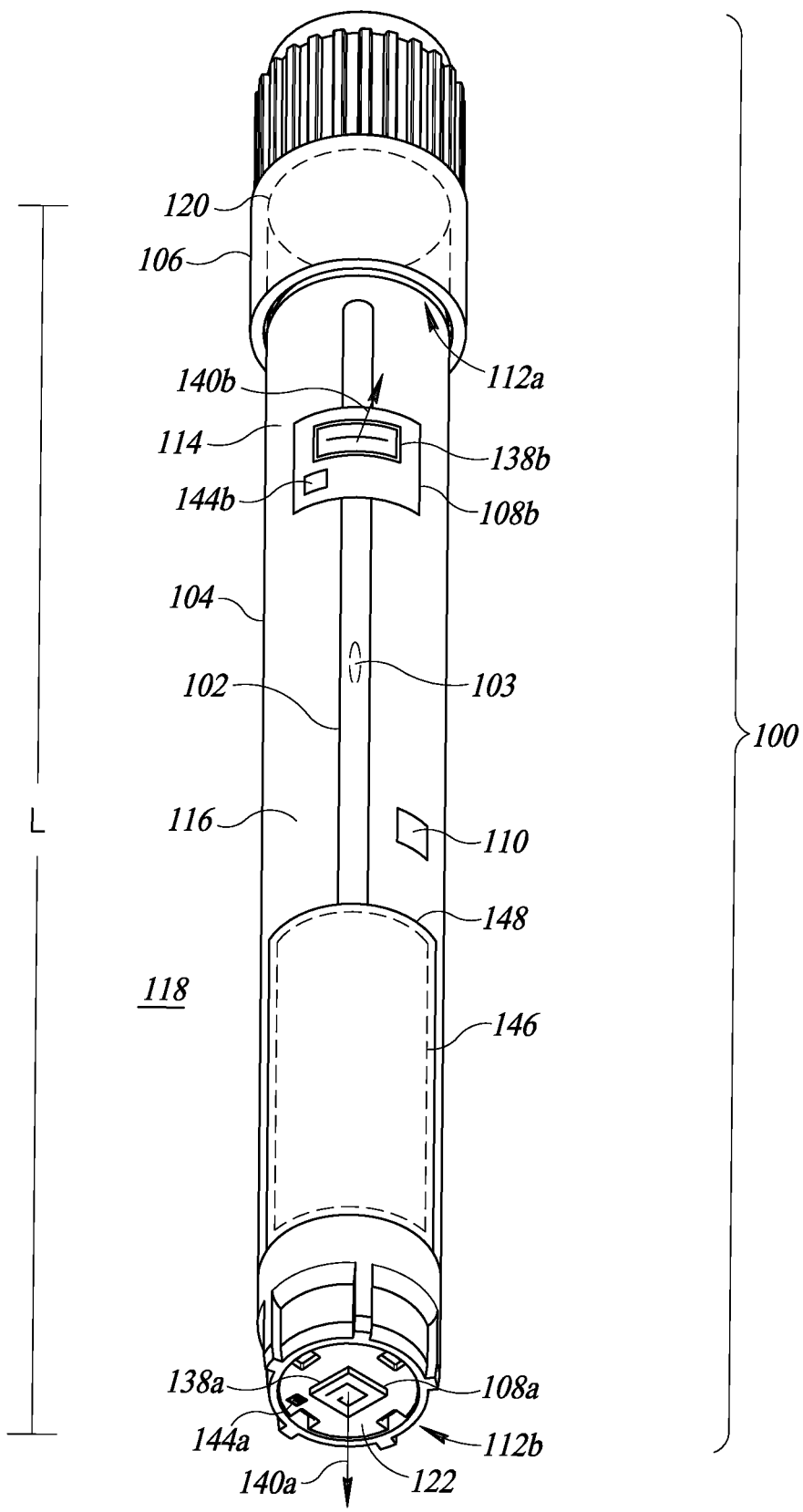
FIG. 1 is an isometric view of a container for holding biological samples and a sample cryopreservation storage device held by the container, the container including a vial, a cap, a pair of wireless transponders, a sensor, machine-readable symbols, and a fixed thermal mass, according to at least one implementation.
Figure 2:
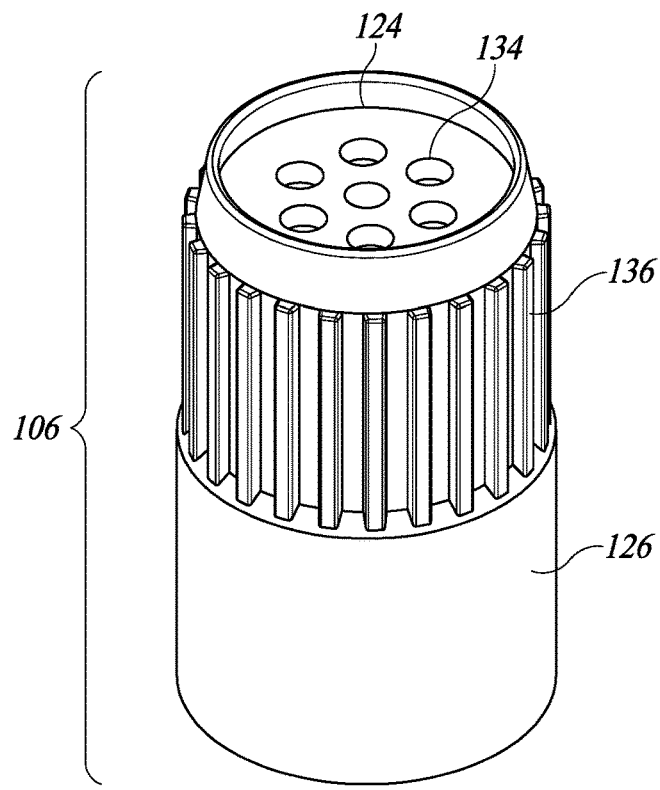
FIG. 2 is a top isometric view of the cap of the container of FIG. 1, according to at least one implementation.
Figure 3:
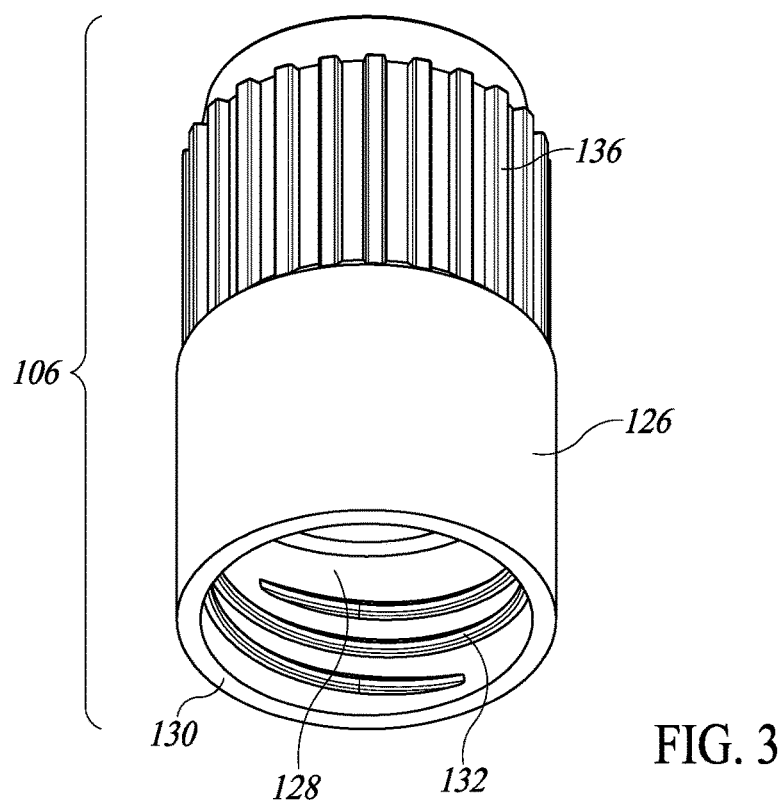
FIG. 3 is a bottom isometric view of the cap of the container of FIG. 1, according to at least one implementation.

FIGS. 1, 2 and 3 show a container 100 holding a sample cryopreservation storage devices (e.g., straw, tube, stick, spatula) 102 which in turn holds biological samples or material 103, according to at least one illustrated implementation.

The container 100 includes a vial 104, a cap 106, a number of wireless transponders 108a, 108b (two shown), and optionally a number of sensors 110 (one shown).

The vial 104 has a first end 112a, a second end 112b, and a side wall 114. The second end 112b is opposed from the first end 112a across a length L of the vial 104, and the side wall 114 extends between the first and the second ends 112a, 112b to delimit an interior cavity 116 of the vial 104 from an exterior 118 thereof. The vial 104 has an opening 120 at the first end 112a thereof, and the second end 112b may be closed or sealable. The vial 104 takes the form of a tube, which may have a circular profile or cross section, or alternatively may have other shapes (e.g., rectangular, hexagonal, octagonal). The opening 120 of the vial 104 may, for example, be circular, although the opening 120 may have other shapes. The second end 112b of the vial 104 may, for example, have a flat surface 122, the flat surface 122 perpendicular to the length L or longitudinal axis of the vial 104. The vial 104 may be formed of any materials suitable to being deposited into a cryogenic bath, for example various polycarbonate, aromatic polyimidies (e.g., PMMA, Kapton, Upilex), and is preferably transparent.

The cap 106 is sized and shaped to removably close the opening 120 at the first end 112a of the vial 104. As best illustrated in FIGS. 2 and 3, the cap 106 may have a top surface 124 and a side wall 126 extending from the top surface 124 to delimit an interior 128 (FIG. 3) of the cap 106. The cap 106 has an opening 130 at an end thereof, the opening 130 having a shape and inner dimension sized to receive the first end 112a of the vial 104. The cap 106 may have a thread 132, for example on an interior of the side wall 126 to threadedly mate to a thread on an exterior of the side wall 114 of the vial 104. The top of surface 124 of the cap 106 may include one or more through-holes 134 (FIG. 2, only one called out) to vent the interior cavity 116 of the vial 104 to the exterior 118 when the cap 106 is secured to the vial 104. An outer surface of the side wall 126 of the cap 106 may include a plurality of ridges 136 (only one called out), which may facilitate gripping when tightening or loosening the cap 106. The cap 106 may be formed of any of a variety of materials, for example polymers, for instance thermoplastics, such as polypropylene or polyethylene, and/or any other suitable material that withstand temperatures common in cryogenic applications without degradation. While the cap 106 is generally illustrated as receiving a portion of the vial 104 therein, in some implementation, the cap 106 may alternatively be sized to have a portion thereof securely received within the opening of the vial 104.

Returning to FIG. 1, as noted, the container 100 may include or bear one or more wireless transponders 108a, 108b (collectively 108), and advantageously two wireless transponders. The wireless transponders 108 may take a variety of forms. For example, active, passive, or battery-assisted radio frequency identification (RFID) transponders employ an integrated circuit (IC) to store and return a unique identifier. Active RFID transponders include a dedicated power source (e.g., a chemical battery cell) to power the RFID transponder. Passive RFID transponder do not include a dedicated power source, but rather derive power from an interrogation signal, typically charging a capacitor, which provides sufficient power to provide a return signal (e.g., back scatter signal) with unique identifying information imposed thereof. Battery-assisted RFID transponders generally detect an interrogation signal, but employ a dedicated power source (e.g., chemical battery cell) to primarily power the operations. Also for example, micro-electro-mechanical systems (MEMS) transponders employ one or typically more mechanical elements which mechanically vibrate or oscillated at respective frequencies to return a unique identifier. These MEMS transponders are mechanically based and typically do not employ ICs, nor do they typically store unique identifiers in memory. The terms "integrated circuit RFID transponder" and "non-MEMS RFID transponder" are used herein to distinguish non-mechanical RFID transponders from mechanical or MEMS based transponders.

The wireless transponders 108 are able to withstand cold temperatures (e.g., negative 150° C.; negative 196° C.) and continue to operate. In particular, the wireless transponders 108 are preferable able to withstand multiple instances of temperature cycling between cold temperatures (e.g., negative 150° C.; negative 196° C.) and relatively warmer temperatures to which the containers may be exposed when removed from a cryogenic cooler or dewar. The wireless transponders 108 may advantageously take the form of passive wireless transponders, which rely on power from interrogation signals to provide responses, for example via backscattering. MEMS transponders may be particularly suitable for operation at cold temperatures.

Each of a first and a second wireless transponder 108a, 108b encodes a unique identifier. The wireless transponders 108 respond to wireless interrogation signals with response signals encoding the unique identifiers, for example via backscattering. In some implementations, both the first and the second wireless transponders 108a, 108b may encode a same unique identifier as one another, which uniquely identifies the container 100. Alternatively, a nontransitory processor-readable medium may store a relationship between pairs of unique identifiers corresponding to pairs of wireless transponders 108 carried or born by a same respective container 100.

Figure 4:
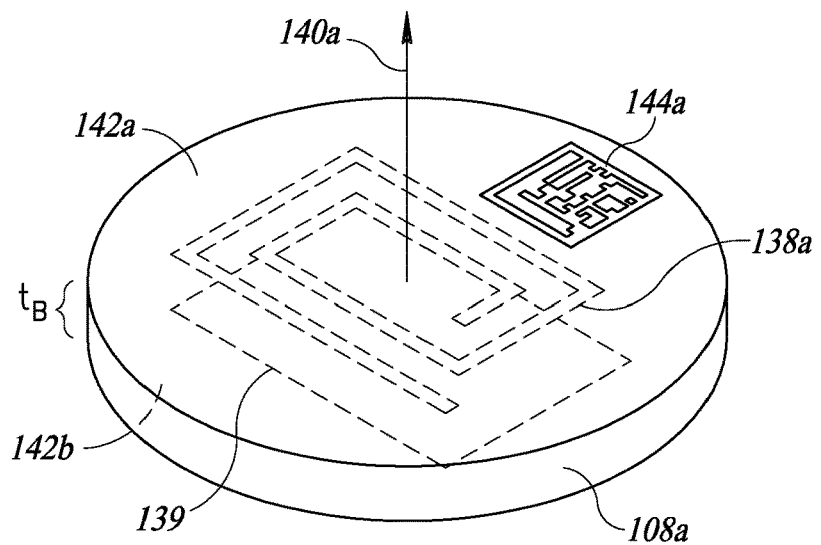
FIG. 4 is an isometric view of a radio frequency identification button cell that can be used as one of the wireless transponders of the container of FIG. 1, according to at least one implementation.
Figure 5:
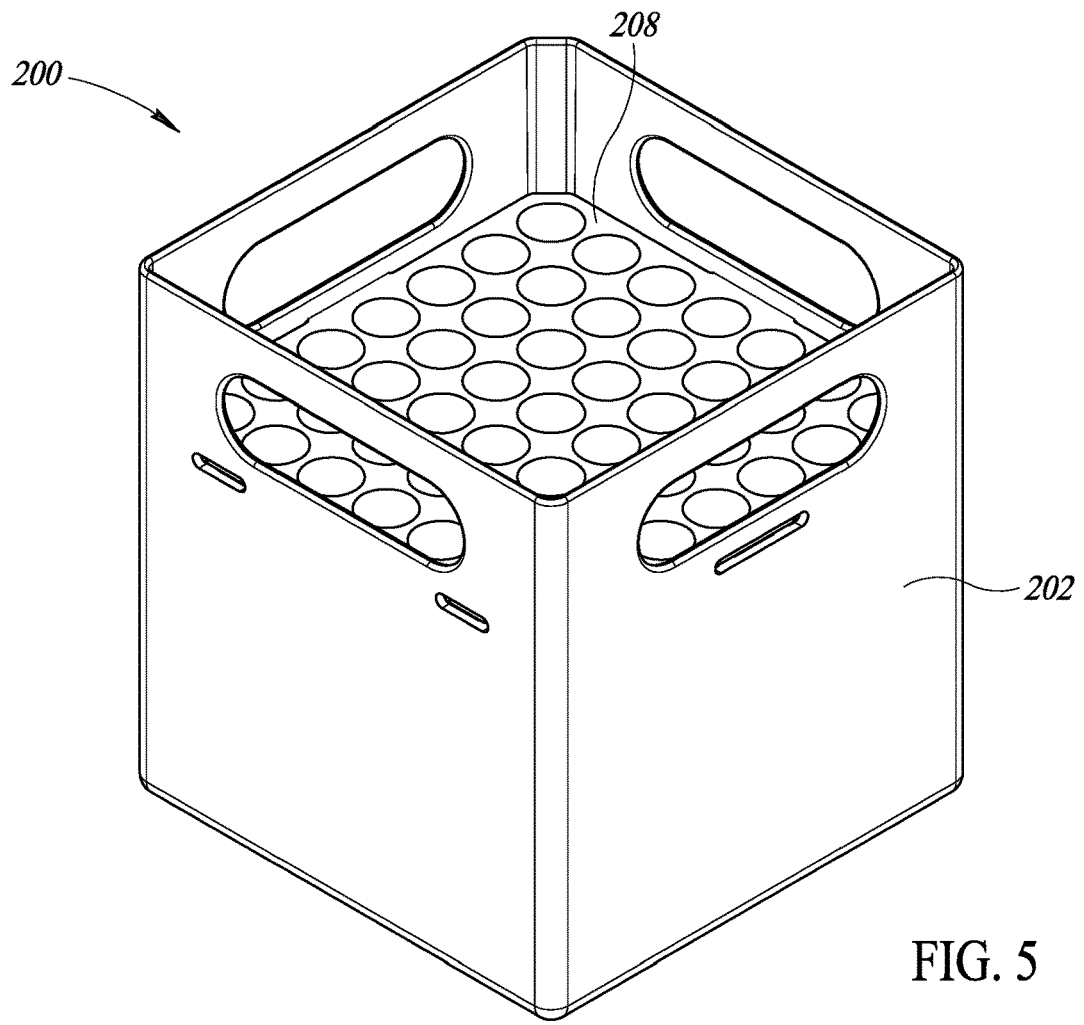
FIG. 5 is an isometric view of a bulk carrier to maintain cryogenic conditions, that can carry an array of 49 separate containers, according to at least one implementation.

In particular, a first wireless transponder 108a has a respective antenna 138a (e.g., first antenna) which is coupled to a respective transponder circuit 139 (e.g., radio, transmitter, backscatter circuit, illustrated in FIG. 4). The first antenna 138a typically has a beam axis 140a aligned with a main lobe of a radiation plot of the first antenna 138a. The first wireless transponder 108a is fixed to the vial 104 with the beam axis 140a thereof extending parallel to the length L or longitudinal axis of the vial 104. The second wireless transponder 108a has a respective antenna 138b (e.g., second antenna) which is coupled to a respective transponder circuit. The second antenna 138b has a beam axis 140b aligned with a main lobe of a radiation plot of the second antenna 138b. The second wireless transponder 108b is fixed to the vial 104 with the beam axis 140b thereof extending perpendicularly to the beam axis 140a of the first antenna 138a. The first antenna 138a may be fixed proximate an end 112a, 112b of the vial 104, preferably at least proximate the second end 112b of the vial 104. For example, the first antenna 138a of the first wireless transponder 108a extends parallel with the flat surface 122 of the bottom of the vial 104. Notably, by providing the first and second wireless transponders 108a, 108b as separate and distinct substrates, the shape of the vial may advantageously be employed to ensure that the beam axes 140a, 140b are perpendicular or orthogonal to one another. This arrangement and positioning may facilitate interrogating or reading from below the vials, for example when held in storage in a cryogenic-cooled container. As best illustrated in FIG. 4, the first wireless transponder 108a may, for instance, take the form of a radio frequency identification (RFID) button cell. The RFID button cell has a pair of major surfaces 142a, 142b opposed across a thickness $t_B$ of the RFID button cell from one another, and which extend parallel with the flat surface 122 (FIG. 1) of the bottom of the vial 104. The second wireless transponder 108b may take the form of a radio frequency identification (RFID) tag. The RFID tag may have a flexible substrate or carrier which bears the second antenna 138b and transponder circuit. The RFID tag may wrap at least partially around an outer perimeter of the side wall 114 of the vial 104. One or both of the wireless transponders 108 may be physically coupled or fixed to the cap 106, as discussed below with respect to FIGS. 29-36.

The first wireless transponder 108a is fixed to a portion of the vial 104, for example via an epoxy. The epoxy may encapsulate the first wireless transponder 108a, or the combination of the vial 104 and epoxy may encapsulate the first wireless transponder 108a, to securely attach and provide environmental protection thereto. Alternatively, the first wireless transponder 108a may be molded or encapsulated in a portion of the vial 104 itself. The second wireless transponder 108b is fixed to a portion of the vial 104, for example via an epoxy. The epoxy may encapsulate the second wireless transponder 108b, or the combination of the vial 104 and epoxy may encapsulate the second wireless transponder 108b, to securely attach and provide environmental protection thereto. Alternatively, the second wireless transponder 108b may be molded or encapsulated in a portion of the vial 104 itself.

As noted, the container 100 may also include or bear one or more sensors 110 (only one shown). The sensor(s) 110 may take a variety of forms, such as, for example, wireless sensors which not only sense conditions but also include an antenna and transponder circuit (e.g., radio, transmitter, backscatter circuit) to wirelessly transmit measurements or other indications of sensed condition from the sensors 110. The sensor(s) 110 are able to withstand cold temperatures (e.g., negative 150° C.; negative 196° C.) and continue to operate. In particular, the sensor(s) 110 are preferable able to withstand multiple instances of temperature cycling between cold temperatures (e.g., negative 150° C.; negative 196° C.) and relatively warmer temperatures to which the containers 100 may be exposed when removed from a cryogenic cooler or dewar.

The one or more sensors 110 may include one or more temperature sensors, and preferably passive temperature sensors, operable to sense temperature in the vial 104, at the vial 104 and/or external to the vial 104. Temperature sensors may include any one or more of optical based temperature sensors (e.g., laser temperature sensors, infrared temperature sensors); or thermocouples, thermistors and/or resistance temperature detectors, or MEMS based temperature sensors in which a frequency of mechanical vibration or oscillation of a vibratory element varies with temperature.

The sensor(s) 110 may be fixed to a portion of the vial 104, for example via an epoxy. The epoxy may encapsulate the sensor(s) 110, or the combination of the vial 104 and epoxy may encapsulate the sensor(s) 110, to securely attach and provide environmental protection thereto. Alternatively, the sensor(s) 110 may be molded or encapsulated in a portion of the vial 104 itself.

In at least some implementations, the sensor(s) 110 may be integral to the wireless transponders 108a, 108b, employing the antenna 138a, 138b and transponder circuits 109 of the wireless transponder 108a, 108b for transmitting information outward from the container 100. Alternatively, one or more sensor(s) 110 may be separate and distinct from the wireless transponders 108a, 108b.

The container 100 may also optionally include or bear one or more machine-readable symbols 144a, 144b. The machine-readable symbols 144a, 144b may take a variety of forms, for example one-dimensional machine readable symbols commonly referred to as barcode symbols, or two-dimensional machine-readable symbols for instance Matrix code symbols. The machine-readable symbols 144a, 144b can be composed of machine-readable symbol characters selected from any of a large variety of symbologies, and readable via any type of machine-readable symbol reader. The machine readable symbols (e.g., ink, media) 144a, 144b are able to withstand cold temperatures (e.g., negative 150° C.; negative 196° C.) and continue to operate. In particular, the machine readable symbols 144a, 144b are preferable able to withstand multiple instances of temperature cycling between cold temperatures (e.g., negative 150° C.; negative 196° C.) and relatively warmer temperatures to which the containers may be exposed when removed from a cryogenic cooler or dewar and remain optically readable.

Each of the one machine-readable symbols 144a, 144b encodes a unique identifier. In some implementations, both a first and a second one machine-readable symbol 144a, 144b may encode a same unique identifier as one another, which uniquely identifies the container 100. Alternatively, a nontransitory processor-readable medium may store a relationship between pairs of unique identifiers corresponding to pairs of one machine-readable symbol 144a, 144b carried or born by a same respective container 100.

The machine-readable symbols 144a, 144b may be fixed to a portion of the vial 104, for example via an epoxy. The epoxy may encapsulate the machine-readable symbols 144a, 144b, or the combination of the vial 104 and epoxy may encapsulate the machine-readable symbols 144a, 144b, to securely attach and provide environmental protection thereto. Alternatively, the machine-readable symbols 144a, 144b may be molded or encapsulated in a portion of the vial 104 itself. The epoxy and/or vial should be sufficiently transparent at a set of wavelengths (e.g., visible wavelengths, infrared wavelengths, ultraviolet wavelengths) that the machine-readable symbols 144a, 144b can be optically scanned or read.

While not illustrated, the container 100 may also optionally include or bear one or more human-readable symbols, for example alphanumeric characters or words or serial numbers.

In at least some implementations, the machine-readable symbols 144a, 144b may be integral to the wireless transponders 108a, 108b, e.g., printed, embossed, inscribed or otherwise applied thereto.

The container 100 may optionally include a fixed thermal mass 146 and a thermal insulator 148 that at least partially surrounds the thermal mass 146 to prevent or inhibit thermal conduction. The thermal mass 146 may be located in the interior cavity 116 of the vial 104. The thermal mass 146 has a larger thermal mass than a thermal mass associated with the sample cryopreservation storage device(s) 102 and the biological materials 103 held by the sample cryopreservation storage device(s) 102. The thermal mass 146 may take the form of a piece of non-ferrous metal or a metal impregnated polymer where the metal is in the form of small pieces, particles or strands that are sufficiently small and discontinuous as to prevent or retard the formation of currents therethrough. The thermal insulator 148 may take a variety of forms, including but not limited to an aerogel (e.g., a microporous solid in which the dispersed phase is a gas, a gel in which the liquid component is replaced with a gas, for instance silica-based, alumina-based, chromia-based, tin oxide-based and carbon based aerogels).

The thermal mass 146 is located along the length L of the vial 104, preferably spaced from both the first wireless transponder 108a and the second wireless transponder 108b by at least a minimum defined distance (e.g., 3 mm) to prevent interference with wireless communications via the wireless transponders 108a, 108b.

Figure 6:
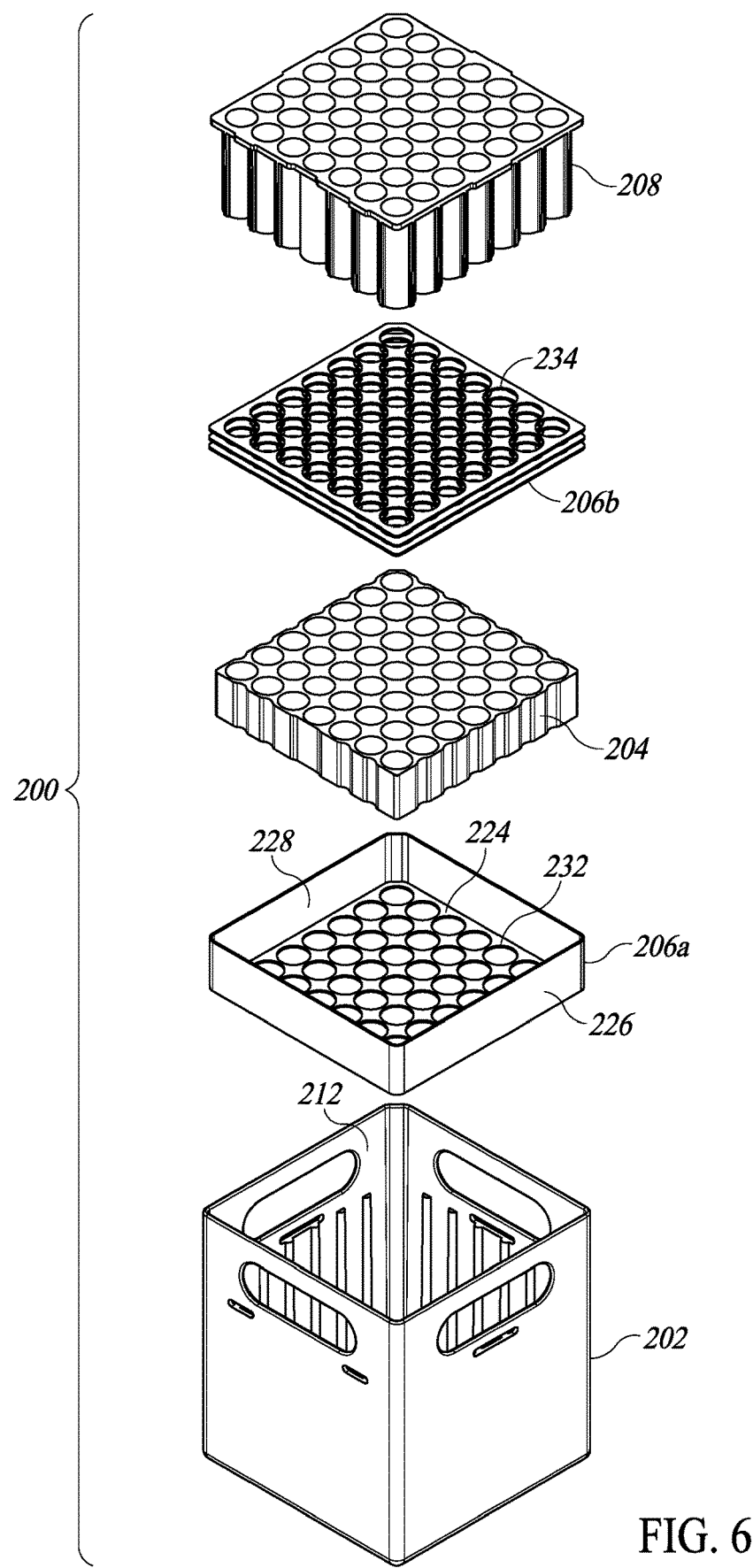
FIG. 6 is an exploded view of the bulk carrier of FIG. 5.
Figure 7:
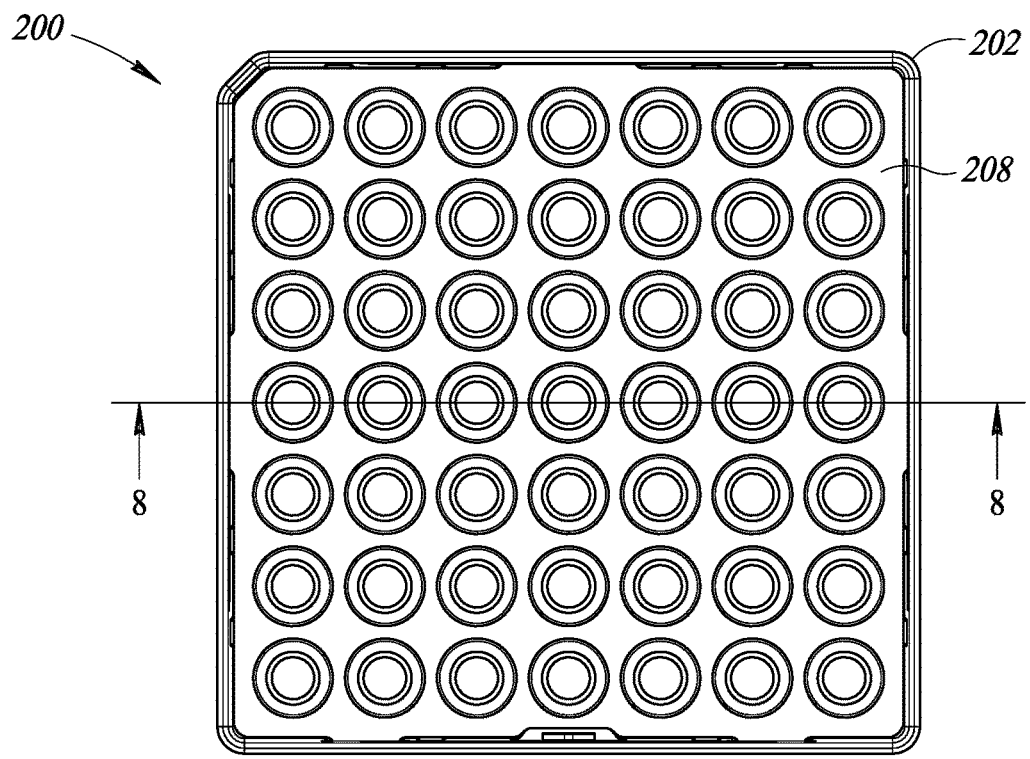
FIG. 7 is top plan view of the bulk carrier of FIG. 5.
Figure 8:
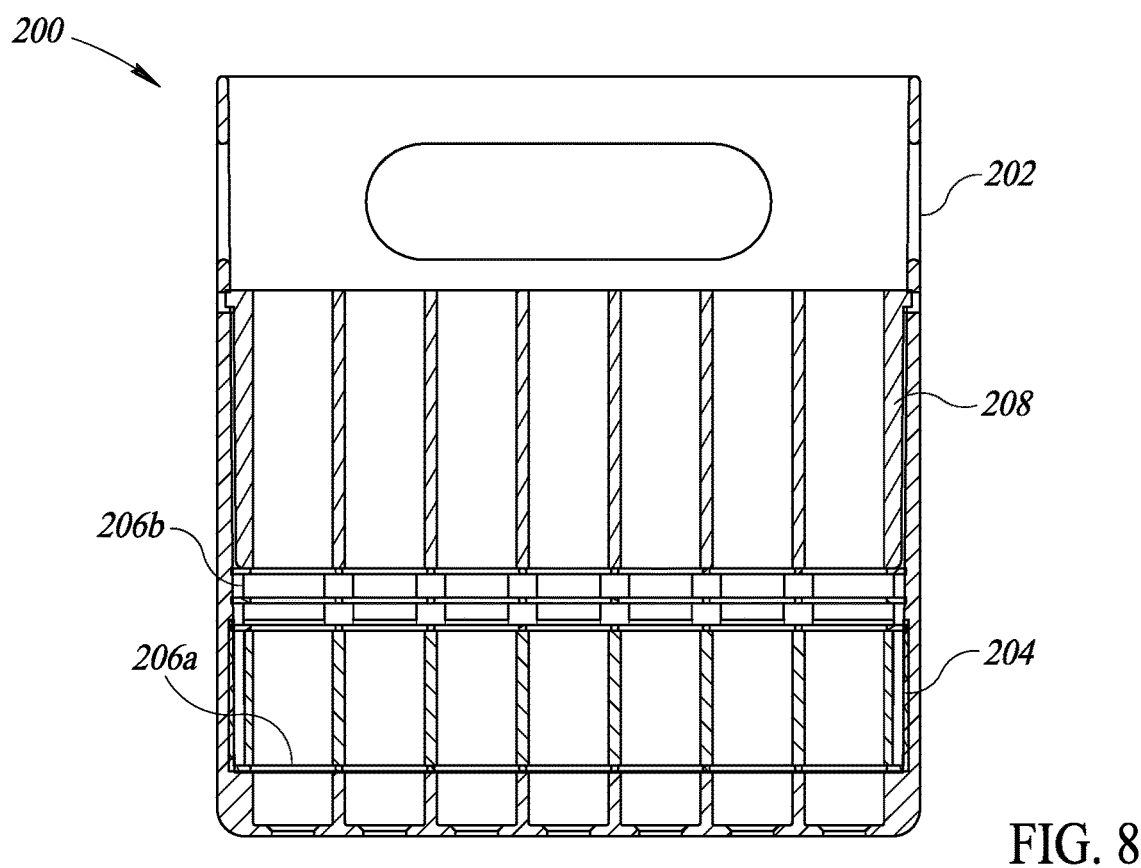
FIG. 8 is cross-sectional view of the bulk carrier of FIG. 7 taken along section line A-A.
Figure 9A:
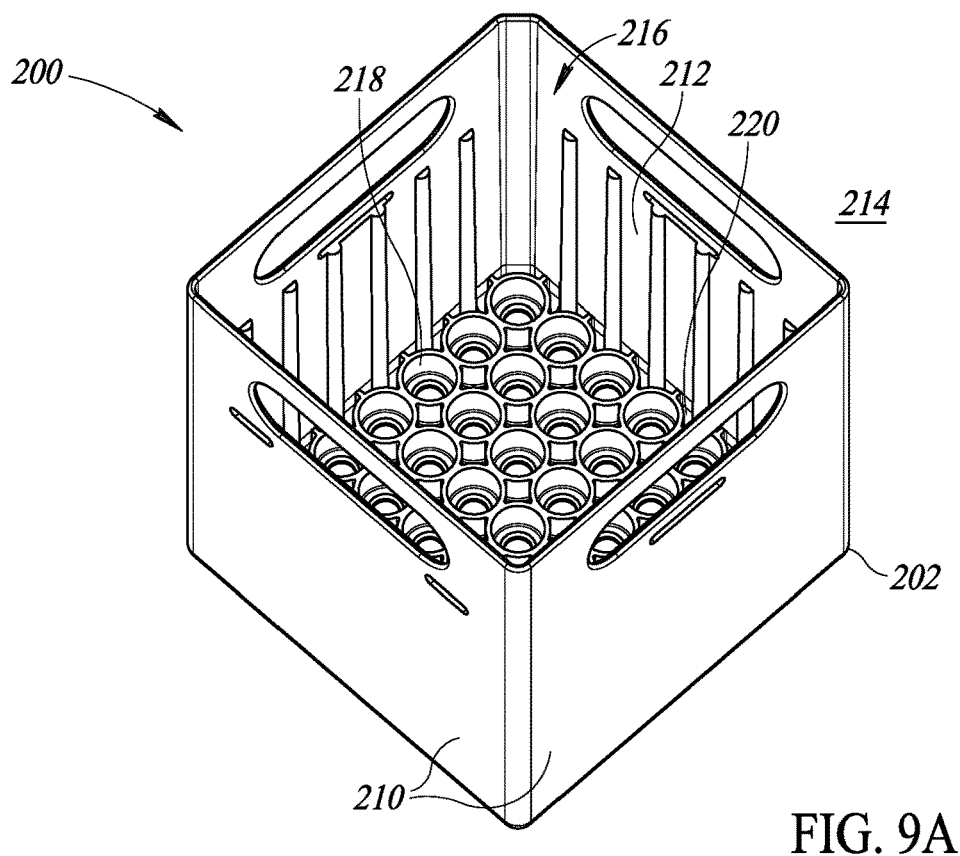
FIG. 9A is a top isometric view of a box of the bulk carrier of FIG. 5.
Figure 9B:
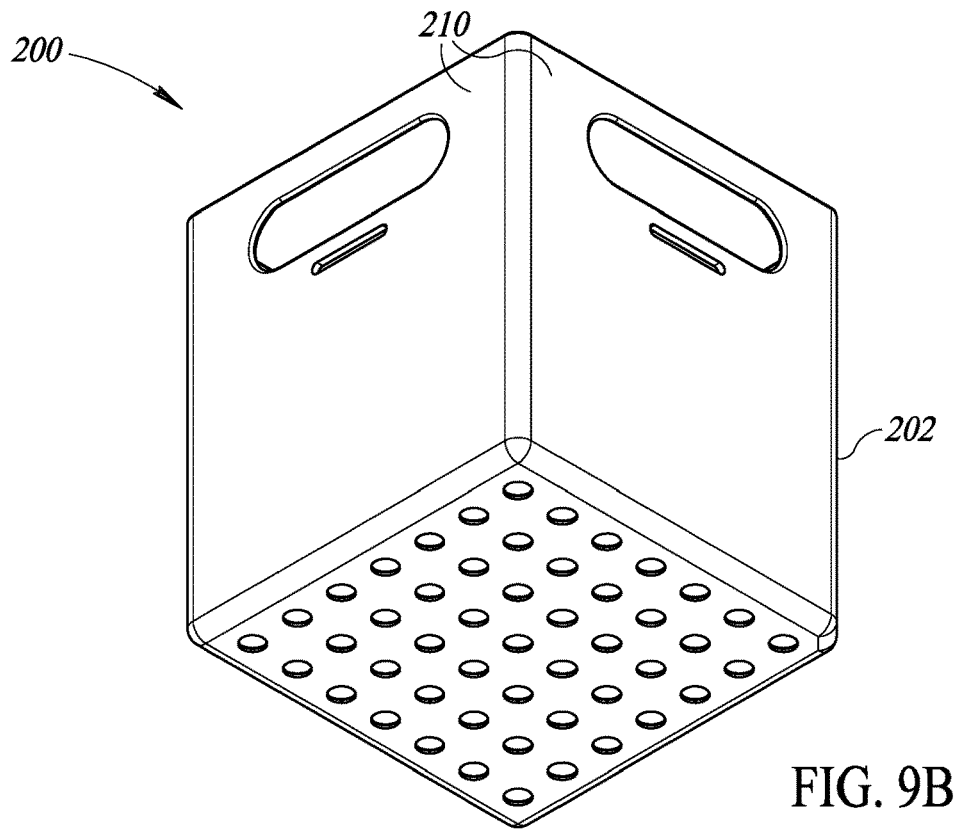
FIG. 9B is a bottom isometric view of a box of the bulk carrier of FIG. 5.
Figure 10:
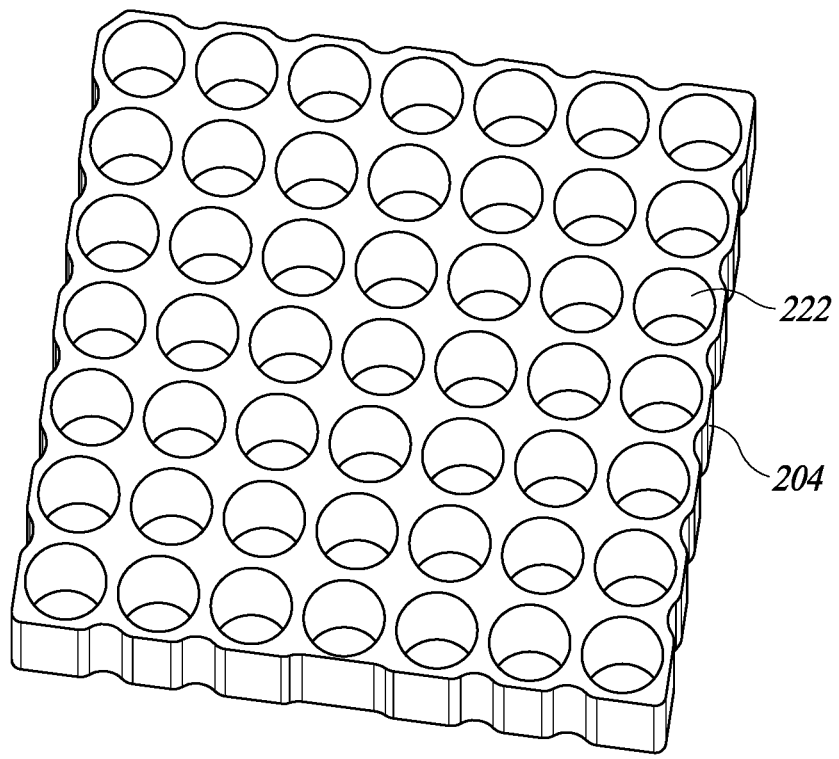
FIG. 10 is an isometric view of a heat shunt of the bulk carrier of FIG. 5.
Figure 11:
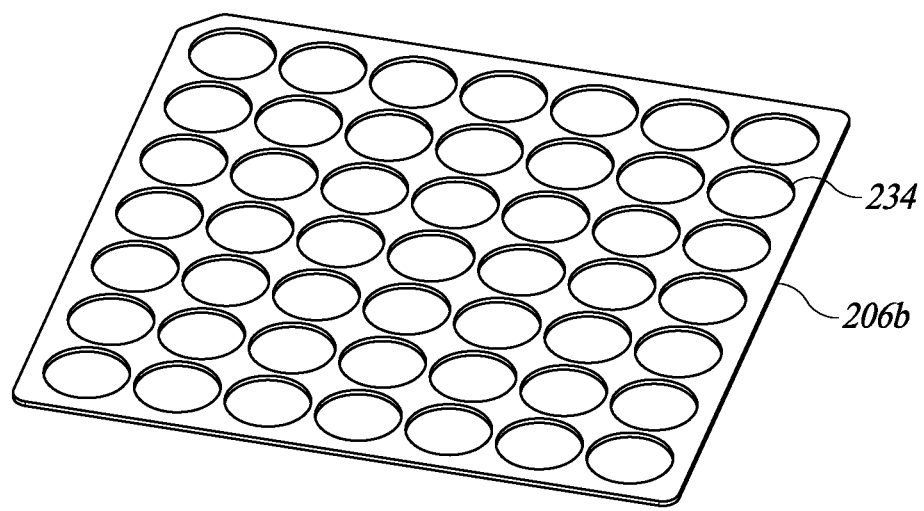
FIG. 11 is an isometric view of a portion of an insulation of the bulk carrier of FIG. 5.
Figure 12:
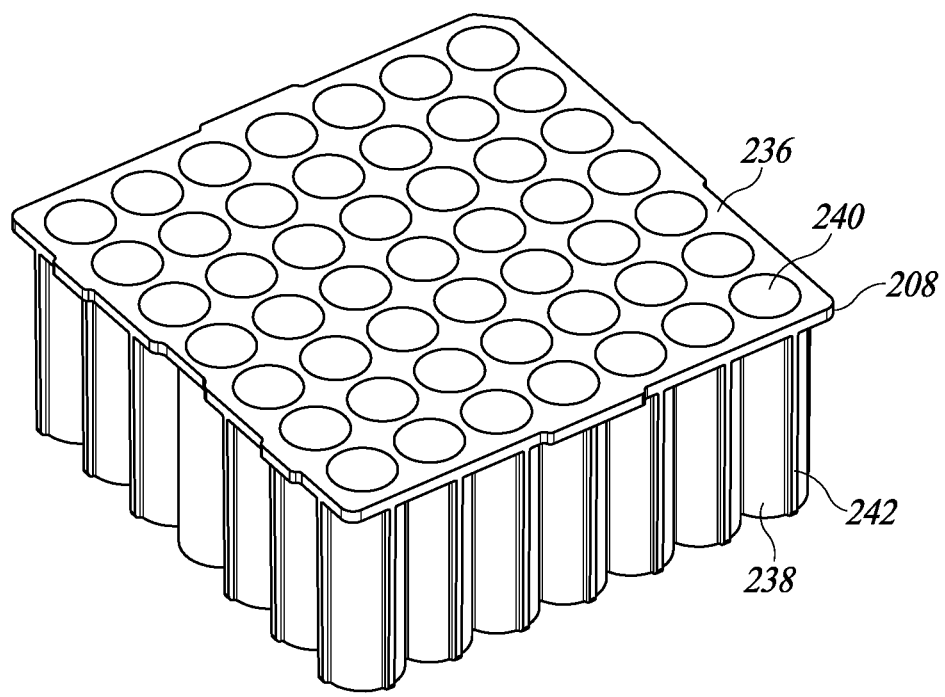
FIG. 12 is a top isometric view of a top spacer of the bulk carrier of FIG. 5.
Figure 13:
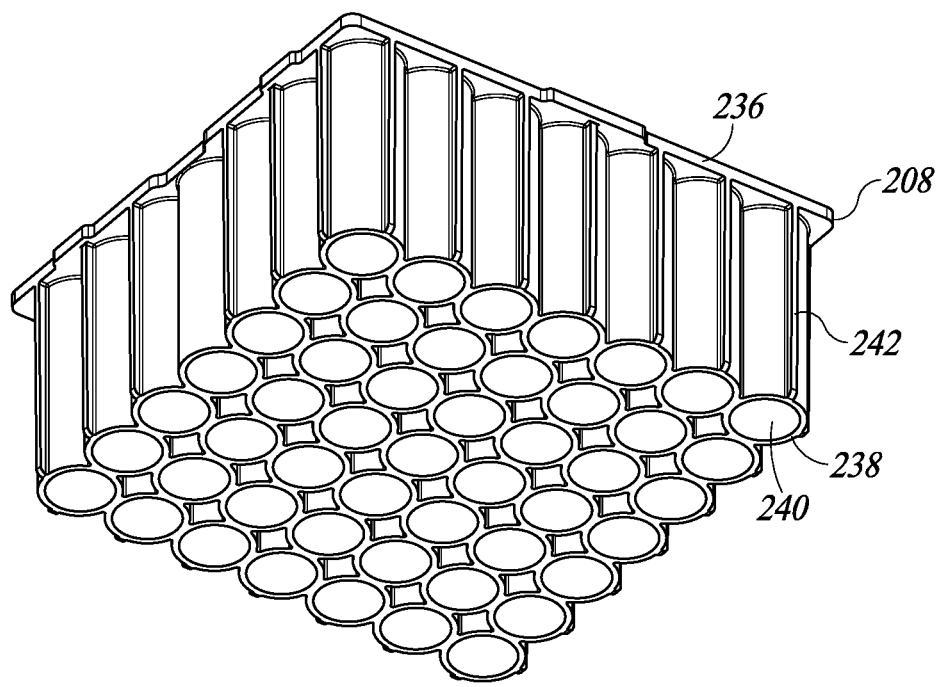
FIG. 13 is a bottom isometric view of the top spacer of the bulk carrier of FIG. 5.

FIGS. 5, 6, 7 and 8 show a bulk carrier 200 to maintain cryogenic conditions, that can carry an array of separate containers 100 (FIG. 1), for example 49 separate containers 100, according to at least one implementation. The bulk carrier may be a portable bulk carrier, allowing specimens carried therein to be transported while maintaining cryogenic temperatures. As best illustrated in FIG. 6, the bulk carrier 200 includes a carrier box 202, thermal shunt 204, thermal insulation 206a, 206b (collectively 206) around the thermal shunt 204, and a top spacer 208. FIGS. 9A and 9B show the carrier box 202 of the bulk carrier 200 of FIGS. 5-8. FIG. 10 shows the heat shunt 204 of the bulk carrier 200 of FIGS. 5-8. FIG. 11 shows a portion of the insulation 206 of the bulk carrier 200 of FIGS. 5-8. FIGS. 12 and 13 show the top spacer 208 of the bulk carrier 200 of FIGS. 5-8.

As best illustrated in FIGS. 6, 9A, and 9B, the carrier box 202 includes a number of walls 210 that delineate an interior 212 of the carrier box 202 from an exterior 214 thereof. The carrier box 202 has an opening 216 to provide access to interior 212 of the carrier box 202 from an exterior 214 thereof. The carrier box 202 may be made of any of a variety of materials, and the walls 210 may be formed of a thermally insulative material (e.g., polymers, plastics), and may or may not include a cavity that entraps a vacuum, inert gas or air between an inner portion and an outer portion of the walls 210.

The carrier box 202 includes an array of receivers 218 (only one called out in FIG. 9A) at a bottom 220 of interior 212 of the carrier box 202. The receivers 218 are shaped and sized to each closely receive a bottom of a respective one of the containers 100 (FIG. 1) and to thereby support the containers 100. The array is alternatively referred to as a cassette, and the individual receivers alternatively referred to as vial wells. For example, in some embodiments, each vial well or receiver 218 has a suitable depth to insulate at least a lower portion of a container 100 inserted therein while exposing at least an upper portion of the inserted container 100 to allow the inserted container 100 to be manipulated for removal, such as manually by hand and/or automatically by an automated or robotic picker or end effector.

The number and arrangement of the receivers 218 may be based on the dimensions of the interior of the carrier box 202, the dimensions of the containers 100 and a desired spacing therebetween. In the illustrated implementation, the receivers 218 are arranged in a 7 by 7 array to accommodate a total of 49 containers 100. The array of receivers 218 may be an integral portion of the carrier box 202, for example molded as part of a molding the carrier box 202. Alternatively, the array of receivers 218 may be a separate and distinct structure, for instance press or friction fit into the carrier box, or even snap fit into the carrier box via tabs and slots or other engagement or securing mechanism. The array of receivers 218 may, for example be made of a polycarbonate.

As best illustrated in FIGS. 6 and 10, the thermal shunt 204 has an outer profile that is sized and shaped to be closely received in the interior 212 of the carrier box 202. The profile may be asymmetrical to ensure that thermal shunt 204 is positioned correctly in the interior 212 of the carrier box 202. The thermal shunt 204 may be made of any of a variety of materials, preferably having a relatively large thermal mass as compared to the materials to be stored in the carrier box 202. Suitable materials for the thermal shunt 204 may include, for example, slabs of non-ferrous metals, or metal impregnated polymers where the metal is a non-ferrous metal or the metal is in the form of small pieces, particles or strands that are sufficiently small and discontinuous as to prevent or retard the formation of currents therethrough. In at least some implementations, the thermal shunt 204 takes the form of an aluminum plate or slab.

The thermal shunt 204 has an array of through-holes 222 (only one called out in FIG. 10) extending therethrough. The through-holes are shaped and sized to closely receive respective ones of the containers 100 (FIG. 1) extending therethrough. The number and arrangement of the through-holes 222 in the thermal shunt 204 may match the number and arrangement of receivers 218 of the carrier box 202. When the thermal shunt 204 is positioned in the interior 212 of the cavity box 202, the through-holes 222 of the thermal shunt 204 should align with respective ones of the receivers 218. In the illustrated implementation, the through-holes 222 of the thermal shunt 204 are arranged in a 7 by 7 array to accommodate a total of 49 containers 100.

As best illustrated in FIGS. 6 and 11, the thermal insulator(s) 206 is sized and shaped to be closely received in the interior of the carrier box 202. The thermal insulator 206 may be provided in two parts, a thermal insulation tray 206a and a thermal insulation plate 206b. The thermal insulation tray 206a has a base 224 (FIG. 6) and an upstanding side wall 226 (FIG. 6), that forms a space 228 therebetween. An outer surface of the upstanding side wall 226 is shaped and dimensioned to be closely received in the interior 212 of the carrier box 202. The thermal insulation plate 206b has an outer periphery which is of a shape and size so as to be closely received in the space 228 by an inner surface of the upstanding side wall 226 of the thermal insulation tray 206a, in a nested configuration. The thermal insulation tray 206a and thermal insulation plate 206b may sandwich the thermal shunt 204, for example thermally insulating the thermal shunt 204 on all sides thereof. The thermal insulation tray 206a and thermal insulation plate 206b may be made of any of a variety of materials, preferably having a relatively large thermal resistance or R factor. Some suitable materials may include, but are not limited to, aerogels.

Both the thermal insulation tray 206a and thermal insulation plate 206b has a respective array of through-holes 232, 234 (only one called out for ach array), respectively, extending therethrough. The through-holes 232, 234 are shaped and sized to closely receive respective ones of the containers 100 (FIG. 1) extending therethrough. The number and arrangement of the through-holes 232, 234 in the thermal insulation tray 206a and thermal insulation plate 206b may match the number and arrangement of receivers 218 of the carrier box 202. When the thermal insulation tray 206a and thermal insulation plate 206b are positioned in the interior 212 of the cavity box 202, the through-holes 232, 234 of the thermal insulation tray 206a and thermal insulation plate 206b should align with respective ones of the receivers 218 as well as with the through-holes 222 of the thermal shunt 204. In the illustrated implementation, the through-holes 232, 234 of the thermal insulation tray 206a and thermal insulation plate 206b are arranged in a 7 by 7 array to accommodate a total of 49 containers 100.

As best illustrated in FIGS. 12 and 13, the top spacer 208 has a plate 236 with a profile that is sized and shaped to be closely received in the interior 212 of the carrier box 202. The plate 236 may have an asymmetric profile to ensure that the top spacer 208 is correctly positioned in the interior 212 of the carrier box 202.

The top spacer 208 has an array of tubes 238 (only one called out) each with a respective through-hole 240. The through-holes 240 are shaped and sized to closely receive respective ones of the containers 100 (FIG. 1) extending therethrough. The number and arrangement of the tubes 238 and through-holes 240 in the top spacer may match the number and arrangement of receivers 218 of the carrier box 202. When the top spacer 208 is positioned in the interior 212 of the cavity box 202, the through-holes 240 of the top spacer 208 should align with respective ones of the receivers 218 as well as the through-holes 222 of the thermal shunt 204 and the through-holes 232, 234 of the thermal insulation tray 206a and a thermal insulation plate 206b. In the illustrated implementation, the through-holes 240 of the top spacer 208 are arranged in a 7 by 7 array to accommodate a total of 49 containers 100.

The top spacer 208 may be made of any of a variety of materials, preferably polymers. The top spacer 208 may include a set of spacers 242, which extend laterally outwardly from tube 240 on an exterior of the top spacer to supportingly engage the walls 210 of the carrier box 202.

FIG. 14 shows a bulk carrier 300 to maintain cryogenic conditions, that can carry an array of separate containers 100 (FIG. 1), for example 4 separate containers 100, according to at least one implementation. The bulk carrier 300 includes a carrier box 302, and a smaller "patient" carrier 303 removably positioned in the carrier box 302. As explained below, the smaller "patient" carrier 303 may carry an array of separate containers 100 (FIG. 1), for example 4 separate containers 100.

The carrier box 302 may be similar or even identical to the carrier box 202 of FIGS. 5, 6, 9A and 9B. Similar or even identical structures are identified using the same reference numbers as used in describing carrier box 202. The carrier box 302 includes a number of walls 210 that delineate an interior 212 of the carrier box 202 from an exterior 214 thereof. The carrier box 202 has an opening 216 to provide access to interior 212 of the carrier box 202 from an exterior 214 thereof. The carrier box 202 may be made of any of a variety of materials, and the walls 210 may be formed of a thermally insulative material (e.g., polymers, plastics), and may or may not include a cavity that entraps a vacuum, inert gas or air between an inner portion and an outer portion of the walls 210.

The carrier box 202 includes an array of receivers 218 (only one called out in FIG. 9A) at a bottom 220 of interior 212 of the carrier box 202. The receivers 218 are shaped and sized to each closely receive a bottom of a respective one of the containers 100 (FIG. 1) and to thereby support the containers 100. The number and arrangement of the receivers 218 may be based on the dimensions of the interior of the carrier box 202, the dimensions of the containers 100 and a desired spacing therebetween. In the illustrated implementation, the receivers 218 are arranged in a 7 by 7 array to accommodate a maximum of 49 containers 100. As explained below, the smaller "patient" carrier 303 may be positioned in the interior 212 of the carrier box 202 with through-holes of a portion of the smaller "patient" carrier 303 aligned with respective ones of a subset of the receivers 218.

As best illustrated in FIGS. 14, 15 and 16, the smaller "patient" carrier 303 includes a number of walls 310 that delineate an interior 312 of the smaller "patient" carrier 303 from an exterior 314 thereof. The smaller "patient" carrier 303 has an opening 316 to provide access to interior 312 of the smaller "patient" carrier 303 from an exterior 314 thereof. The smaller "patient" carrier 303 may be made of any of a variety of materials, and the walls 310 may be formed of a thermally insulative material (e.g., polymers, plastics), and may or may not include a cavity that entraps a vacuum, inert gas or air between an inner portion and an outer portion of the walls 310. The smaller "patient" carrier 303 may resemble a pedestal, having a base and an upright portion.

The smaller "patient" carrier 303 includes an array of receivers 318 (only one called out in FIG. 15) at a bottom 320 of interior 312 of the smaller "patient" carrier 303. The receivers 318 are shaped and sized to each closely receive a bottom of a respective one of the containers 100 (FIG. 1) and to thereby support the containers 100. The number and arrangement of the receivers 318 may be based on the dimensions of the interior of the smaller "patient" carrier 303, the dimensions of the containers 100 and a desired spacing therebetween. In the illustrated implementation, the receivers 318 are arranged in a 2 by 2 array to accommodate a maximum of 49 containers 100. The receivers 318 each have a respective through-hole 323 (only one called out) that passes through a wall at the bottom 320 of the smaller "patient" carrier 303. The through-holes 323 may have a smaller dimension than an inner dimension of the receivers 318 so as to form a stop in each receiver 318, to support a respective container 100 (FIG. 1) at a specific depth or height in the smaller "patient" carrier 303, and hence establishing a distance between a bottom of the containers 100 and a bottom 220 of the carrier box 202. This may advantageously position wireless transponders 108a carried by the containers 100 within a defined range of one or more antennas when the carrier box 202 is positioned relative to antennas of an interrogator or reader. As previously noted the smaller "patient" carrier 303 may be positioned in the interior 212 of the carrier box 202 with through-holes 323 of the smaller "patient" carrier 303 aligned with respective ones of a subset of the receivers 218 of the carrier box 202.

Figure 19:
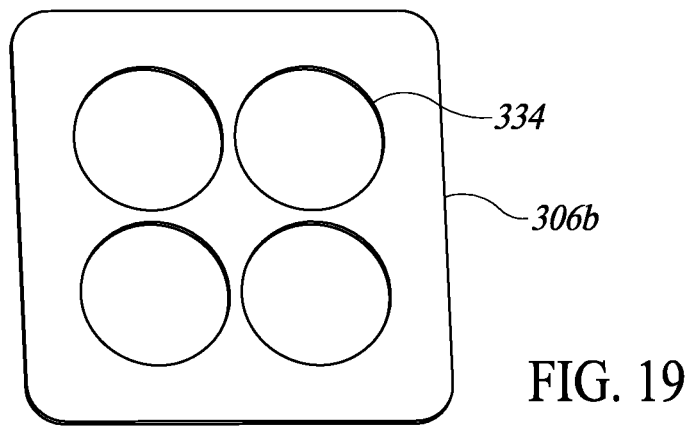
FIG. 19 is a top isometric view of an insulation plate for the patient carrier, according to at least one implementation.
Figure 20:
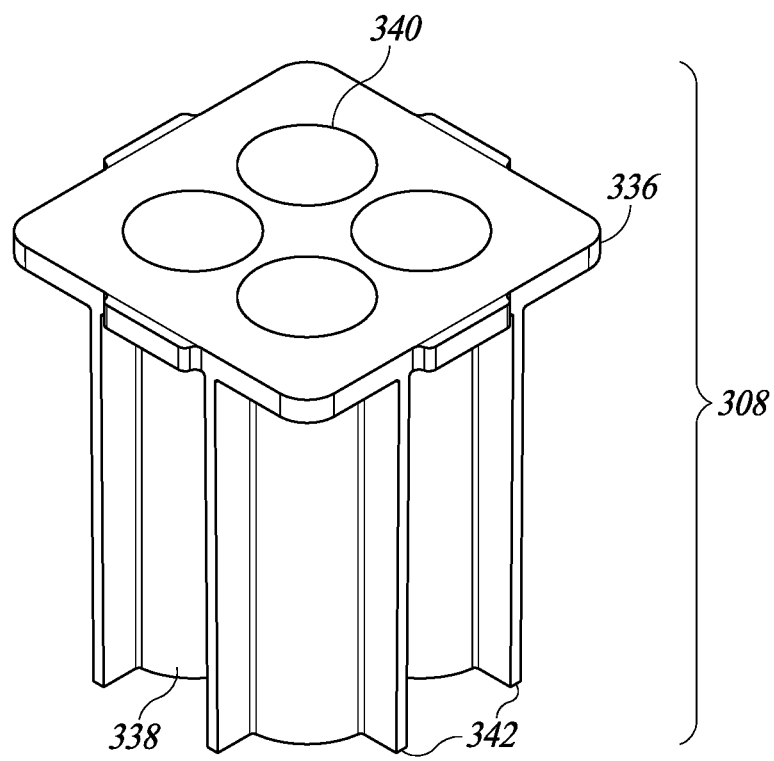
FIG. 20 is a top isometric view of a top spacer for the patient carrier, according to at least one implementation.
Figure 21:
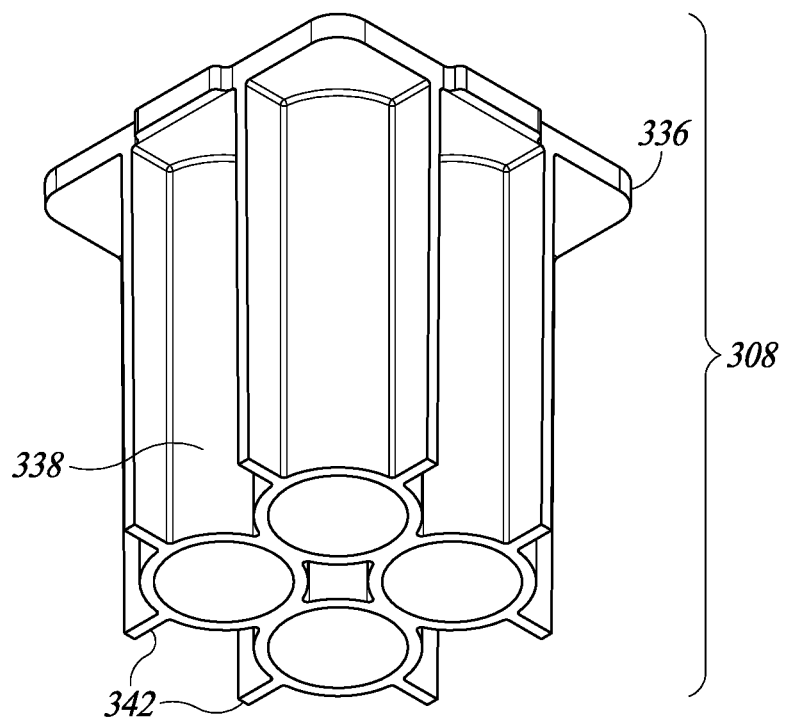
FIG. 21 is a bottom isometric view of a top spacer for the patient carrier, according to at least one implementation.

The smaller "patient" carrier 303 may include structures that are similar to those discussed above with reference to the bulk carrier 200, for example a thermal shunt 304 (FIG. 17), thermal insulation 306a, 306b (collectively 306) (FIGS. 18 and 19), and a top spacer 308 (FIGS. 20 and 21).

Figure 17:
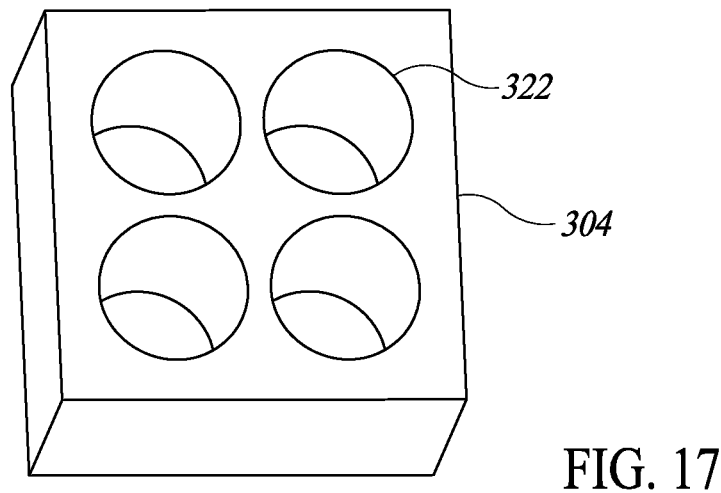
FIG. 17 is an isometric view of a heat shunt plate of the patient carrier, according to at least one implementation.

As illustrated in FIG. 17, the thermal shunt 304 has an outer profile that is sized and shaped to be closely received in the interior 312 of the "patient" carrier 303. The profile may be asymmetrical to ensure that thermal shunt 304 is positioned correctly in the interior 312 of the "patient" carrier 303. The thermal shunt 304 may be made of any of a variety of materials, preferably having a relatively large thermal mass as compared to the materials to be stored in the "patient" carrier 303. Suitable materials for the thermal shunt 304 may include, for example, slabs of non-ferrous metals, or metal impregnated polymers where the metal is a non-ferrous metal or the metal is in the form of small pieces, particles or strands that are sufficiently small and discontinuous as to prevent or retard the formation of currents therethrough. In at least some implementations, the thermal shunt 304 takes the form of an aluminum plate or slab.

The thermal shunt 304 has an array of through-holes 322 (only one called out in FIG. 17) extending therethrough. The through-holes 322 are shaped and sized to closely receive respective ones of the containers 100 (FIG. 1) extending therethrough. The number and arrangement of the through-holes 322 in the thermal shunt 304 may match the number and arrangement of receivers 318 of the "patient" carrier 303. When the thermal shunt 304 is positioned in the interior 312 of the "patient" carrier 303, the through-holes 322 of the thermal shunt 304 should align with respective ones of the receivers 318 and associate through-holes 323 of the receivers 318. In the illustrated implementation, the through-holes 322 of the thermal shunt 304 are arranged in a 2 by 2 array to accommodate a total of 4 containers 100 (FIG. 1).

Figure 18:
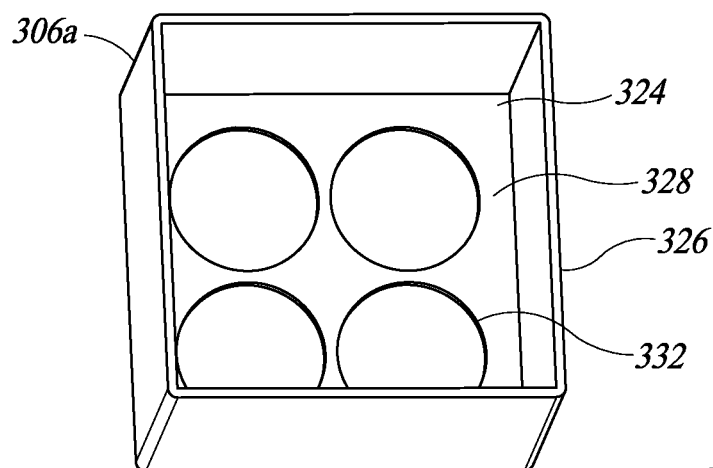
FIG. 18 is a top isometric view of an insulation tray for the patient carrier, according to at least one implementation.

As illustrated in FIGS. 18 and 19, one or more thermal insulators 306a, 306b (collectively 306) is sized and shaped to be closely received in the interior 312 of the "patient" carrier 303. The thermal insulator 306 may be provided in two parts, a thermal insulation tray 306a (illustrated in FIG. 18) and a thermal insulation plate 206b (illustrated in FIG. 19). The thermal insulation tray 306a has a base 324 and an upstanding side wall 326 (FIG. 6), that forms a space 328 therebetween. An outer surface of the upstanding side wall 326 is shaped and dimensioned to be closely received in the interior 312 of the "patient" carrier 303. The thermal insulation plate 306b has an outer periphery which is of a shape and size so as to be closely received in the space 328 by an inner surface of the upstanding side wall 326 of the thermal insulation tray 306a, in a nested configuration. The thermal insulation tray 306a and thermal insulation plate 306b may advantageously sandwich the thermal shunt 304, for example thermally insulating the thermal shunt 304 on all sides thereof. The thermal insulation tray 306a and thermal insulation plate 306b may be made of any of a variety of materials, preferably having a relatively large thermal resistance or R factor. Some suitable materials may include, but are not limited to, aerogels.

Both the thermal insulation tray 306a and thermal insulation plate 306b has a respective array of through-holes 332, 334 (only one called out for ach array), respectively, extending therethrough. The through-holes 332, 334 are shaped and sized to closely receive respective ones of the containers 100 (FIG. 1) extending therethrough. The number and arrangement of the through-holes 332, 334 in the thermal insulation tray 306a and thermal insulation plate 306b may match the number and arrangement of receivers 318 of the "patient" carrier 303. When the thermal insulation tray 306a and thermal insulation plate 306b are positioned in the interior 312 of the "patient" carrier 303, the through-holes 332, 334 of the thermal insulation tray 306a and thermal insulation plate 306b should align with respective ones of the receivers 318 as well as with the through-holes 322 of the thermal shunt 304. In the illustrated implementation, the through-holes 332, 334 of the thermal insulation tray 306a and thermal insulation plate 306b are arranged in a 2 by 2 array to accommodate a total of 4 containers 100.

As best illustrated in FIGS. 20 and 21, a top spacer 308 for the "patient" carrier 303 has a plate 336 with a profile that is sized and shaped to be closely received in the interior 312 of the "patient" carrier 303. The plate 336 may have an asymmetric profile to ensure that the top spacer 308 is correctly positioned in the interior 312 of the "patient" carrier 303.

The top spacer 308 has an array of tubes 338 (only one called out) each with a respective through-hole 340. The through-holes 340 are shaped and sized to closely receive respective ones of the containers 100 (FIG. 1) extending therethrough. The number and arrangement of the tubes 338 and through-holes 340 in the top spacer 308 may match the number and arrangement of receivers 318 of the "patient" carrier 303. When the top spacer 308 is positioned in the interior 312 of the "patient" carrier 303, the through-holes 340 of the top spacer 308 should align with respective ones of the receivers 318 as well as the through-holes 322 of the thermal shunt 304 and the through-holes 332, 334 of the thermal insulation tray 306a (FIG. 18) and the thermal insulation plate 306b (FIG. 19). In the illustrated implementation, the through-holes 340 of the top spacer 308 are arranged in a 2 by 2 array to accommodate a total of 4 containers 100 (FIG. 1).

The top spacer 308 may be made of any of a variety of materials, preferably polymers. The top spacer 308 may include a set of spacers 342 (only two called out), which extend laterally outwardly from tubes 340 on an exterior of the top spacer 308 to supportingly engage the walls 310 of the "patient" carrier 303.

Figure 22:
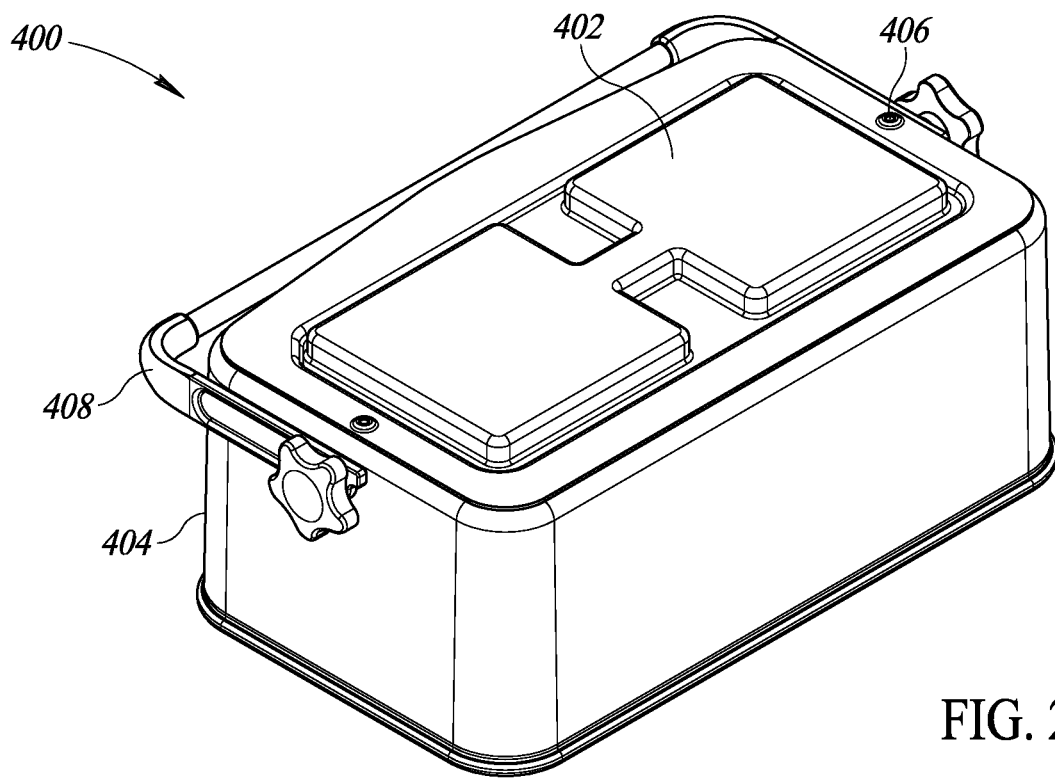
FIG. 22 is a top isometric view of a portable carrier 400 for holding bulk carriers 200, 300 (FIGS. 5, 14) with containers 100 (FIG. 1) that hold biological samples and/or material, with a cover 402 in place, according to at least one implementation.
Figure 23:
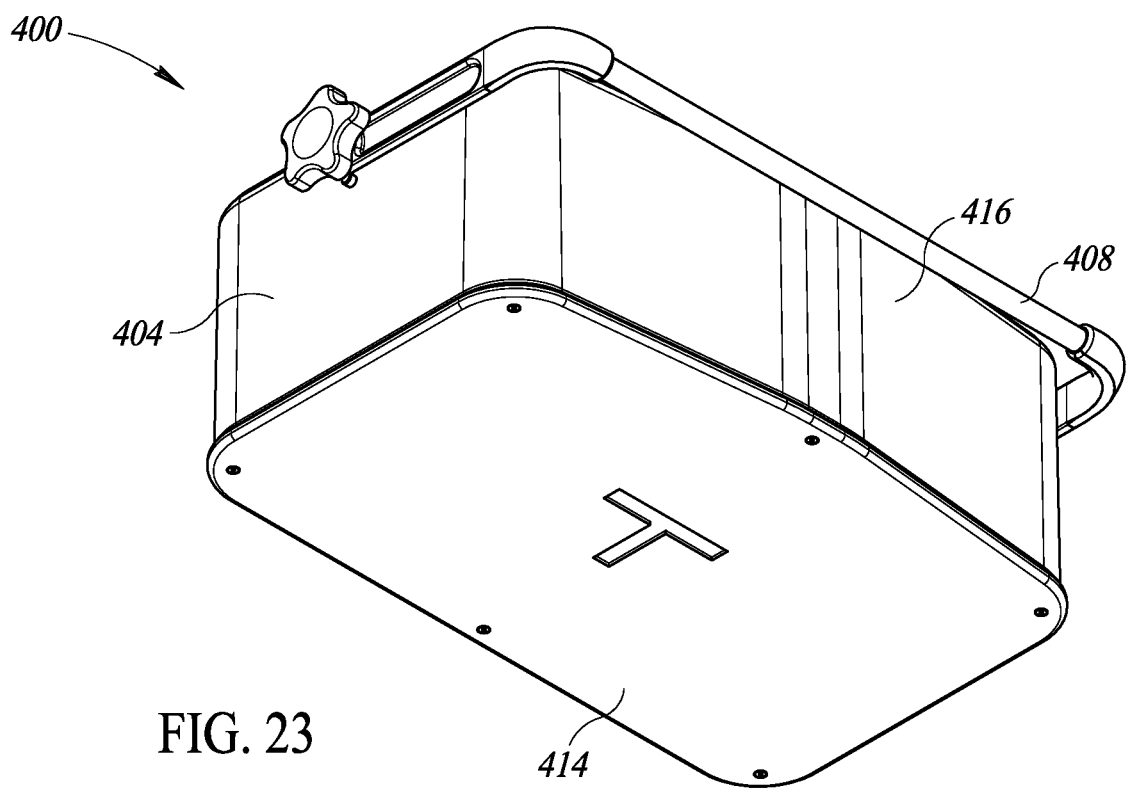
FIG. 23 is a bottom isometric view of the portable carrier of FIG. 22.
Figure 24:
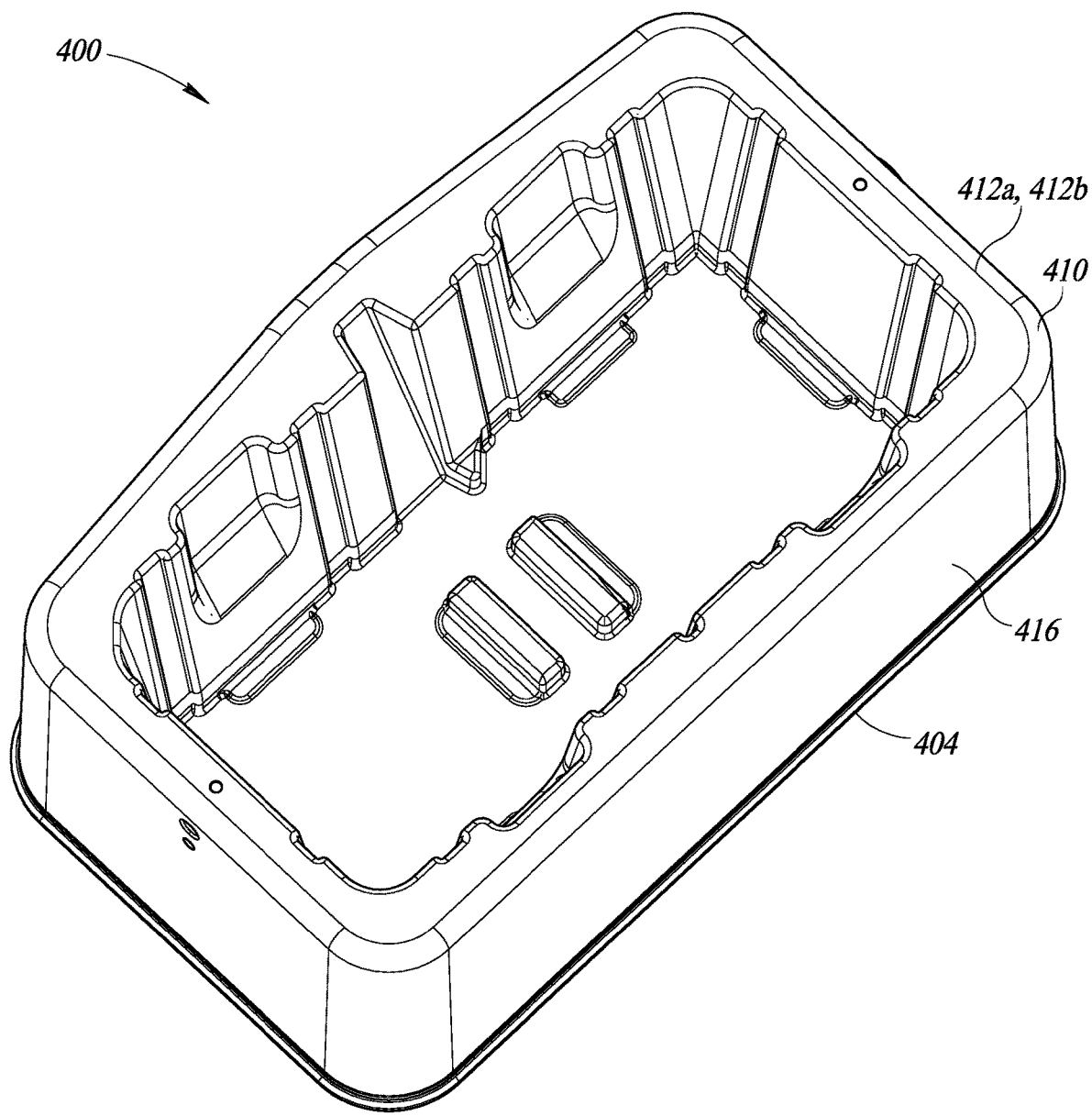
FIG. 24 is a top isometric view of the portable carrier 400 with the cover 402 removed, according to at least one implementation.
Figure 25:
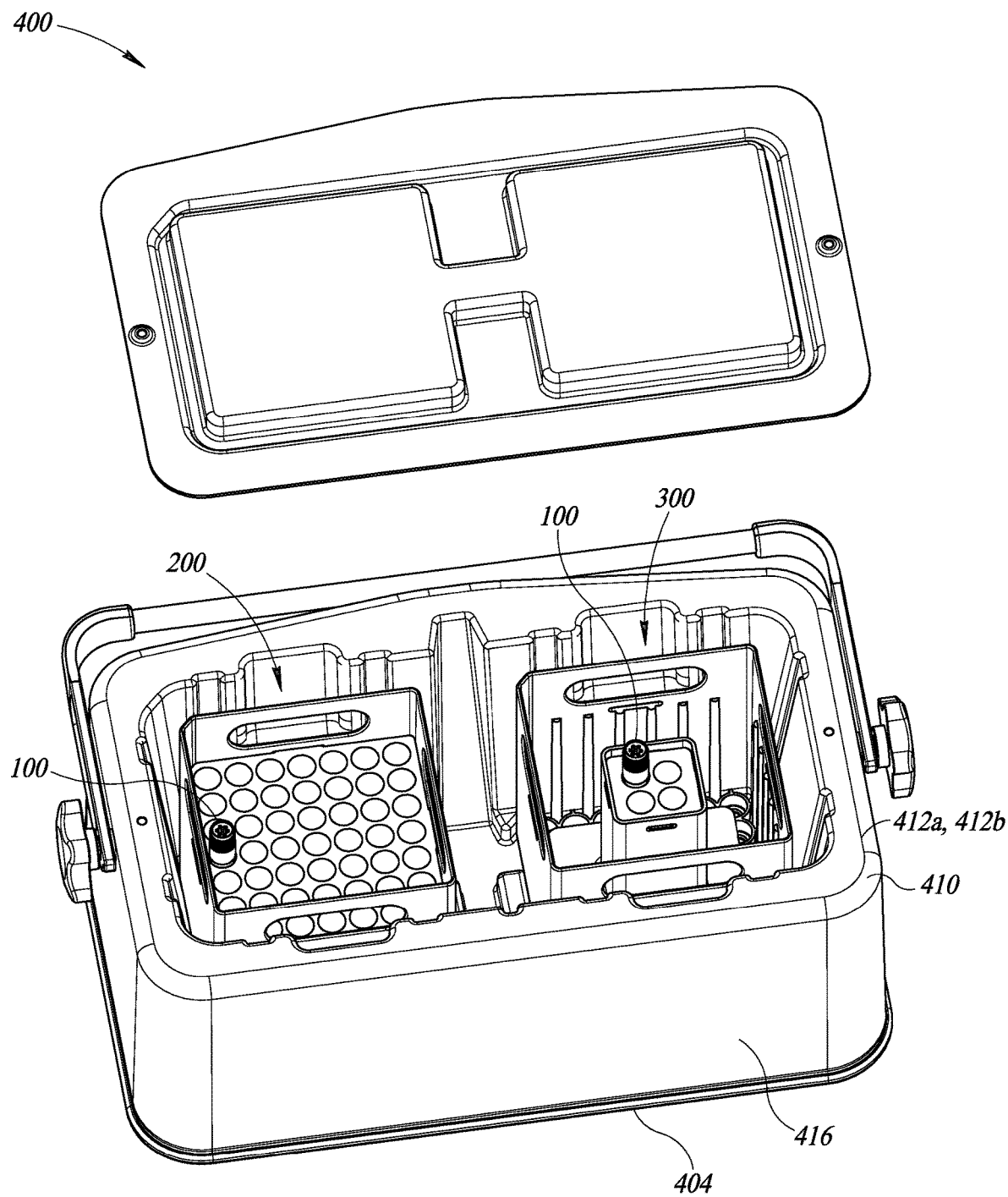
FIG. 25 is a top isometric view of the portable carrier 400 with the cover removed and illustrating bulk carriers 200, 300 (FIGS. 5, 14) loaded therein, according to at least one implementation.

FIGS. 22, 23, 24, 25, 26, 27 and 28 show a portable carrier 400 and components thereof for holding bulk carriers 200, 300 (FIGS. 5, 14) with containers 100 (FIG. 1) that hold biological samples and/or material. In particular, FIG. 22 shows portable carrier 400 with a cover 402 in place, while FIG. 24 shows the portable carrier 400 with the cover 402 removed, and FIG. 25 shows the portable carrier 400 with the cover 402 removed and two bulk carriers 200, 300 loaded therein.

As best illustrated in FIG. 22, the portable carrier 400 includes a housing 404 and a removable cover 402. The portable carrier 400 may include one or more latches 406 (only one called out) movable to secure the removable cover 402 in a closed position or configuration to seal an interior of the portable carrier 400 from an exterior thereof. As best illustrated in FIGS. 22 and 23, the portable carrier 400 may optionally include a carrying handle 408.

As best illustrated in FIGS. 24 and 25, the housing 404 may be formed by an exterior shell 410. In particular, the exterior shell 410 may include an exterior bottom 414 (FIG. 23) and at least one exterior wall 416 extending upwardly from a periphery of the exterior bottom 414, the exterior bottom 414 and exterior wall 416 delimiting a first cavity, open at a top thereof.

Figure 26:
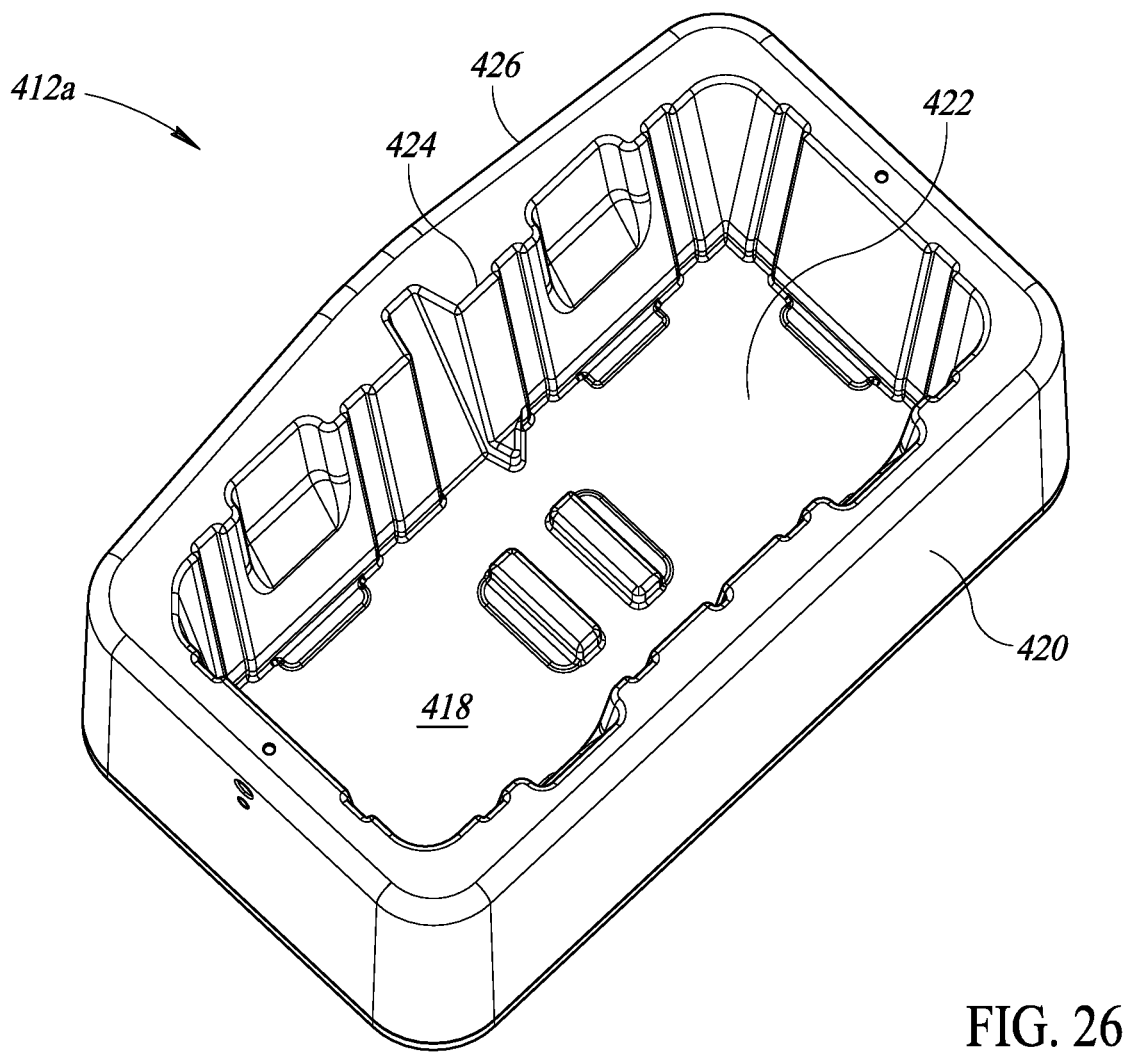
FIG. 26 is a top isometric view of an interior insert of the portable carrier 400, according to at least one implementation.

FIG. 26 shows an interior insert 412a of the portable carrier 400, according to at least one implementation. The interior insert 412a is received by or inserted into the exterior shell 410, with a space formed between interior insert 412a and the exterior shell 410.

The interior insert 412s may include an interior bottom 418 and at least one interior wall 410 extending upwardly from a periphery of the interior bottom 418, the interior bottom 418 and interior wall 420 delimiting a second cavity 422, having an opening 424 at a top thereof. The interior insert 412a may further include a ledge or shelf 426 extending laterally from an upper edge of the interior wall 420. The interior insert 412a is inserted or received in the first cavity of the exterior shell 410, an outer perimeter of the ledge or shelf 426 in contact with an inner surface of the exterior wall 416 at a top thereof. A space is formed between the exterior wall 416 of the exterior shell 410 and the interior wall 420 of the interior insert 412a, and between the exterior bottom 414 of the exterior shell 410 and the interior bottom 418 of the interior insert 412a. The space may be filled with a ridged or semi-ridged insulation, for example an aerogel. Less preferably, the space may evacuated or entrap a vacuum. Less preferably, the space may be filled with a fluid, for instance an inert gas, or even less preferably air.

Figure 27:
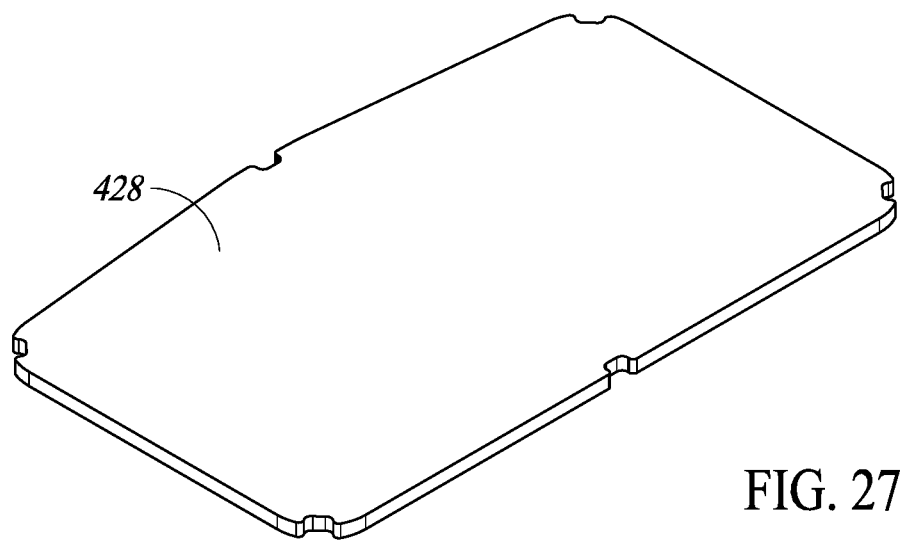
FIG. 27 is a top isometric view of a piece of insulation of the portable carrier of FIG. 22, according to at least one implementation.

FIG. 27 shows a rigid or semi-rigid piece of insulation 428. The piece of insulation 428 may, for example, be positioned in the space between the exterior bottom 414 of the exterior shell 410 and the interior bottom 418 of the interior insert 412a. Alternatively, the piece of insulation 428 may be used as a cover, to removably close the opening 216 (FIG. 6) and thereby limit heat transfer between the interior 212 of the carrier box 202 and the exterior 214 thereof. The piece of insulation may, for example comprise an aerogel.

Figure 28:
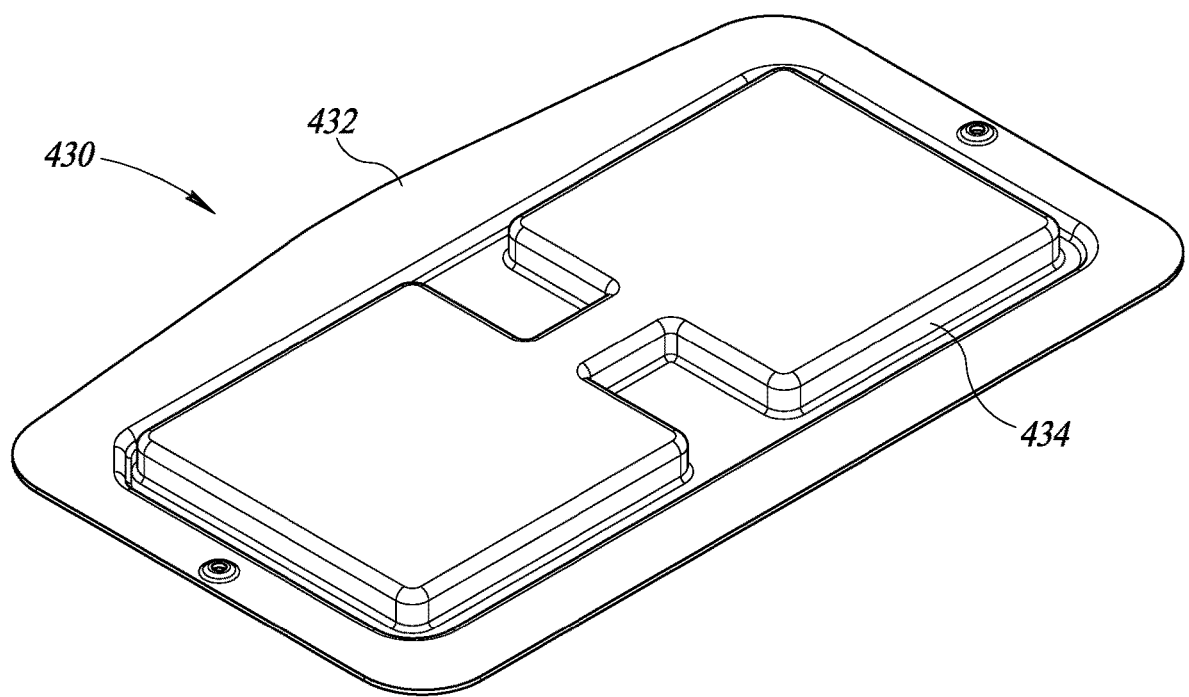
FIG. 28 is a top isometric view of a piece of cover insulation of the portable carrier of FIG. 22, according to at least one implementation.

FIG. 28 shows a piece of cover insulation 430 of the portable carrier 400 of FIG. 22, according to at least one implementation. The cover insulation 430 is positionable to overly the contents of the portable carrier 400, for example overlying the bulk carriers 200, 300 when the bulk carriers 200, 300 are loaded into the portable carrier 400. The cover insulation 430 underlies the removable cover 402. Alternatively, the cover insulation 430 may be used as a cover, to removably close the opening 216 (FIG. 6) and thereby limit heat transfer between the interior 212 of the carrier box 202 and the exterior 214 thereof. The cover insulation 430 has a profile or outer perimeter 432 that is shaped and sized to be closely received by the interior wall 420, eliminating or substantially eliminating convection past the cover insulation 430 The cover insulation 430 may take the form of a rigid or semi-rigid piece of insulation, and may for example comprise an aerogel. The cover insulation 430 may have recesses or canopies 434 to accommodate the contents of the bulk carriers 200, 300, for example to accommodate a height of the containers 100 when loaded.

Figure 29:
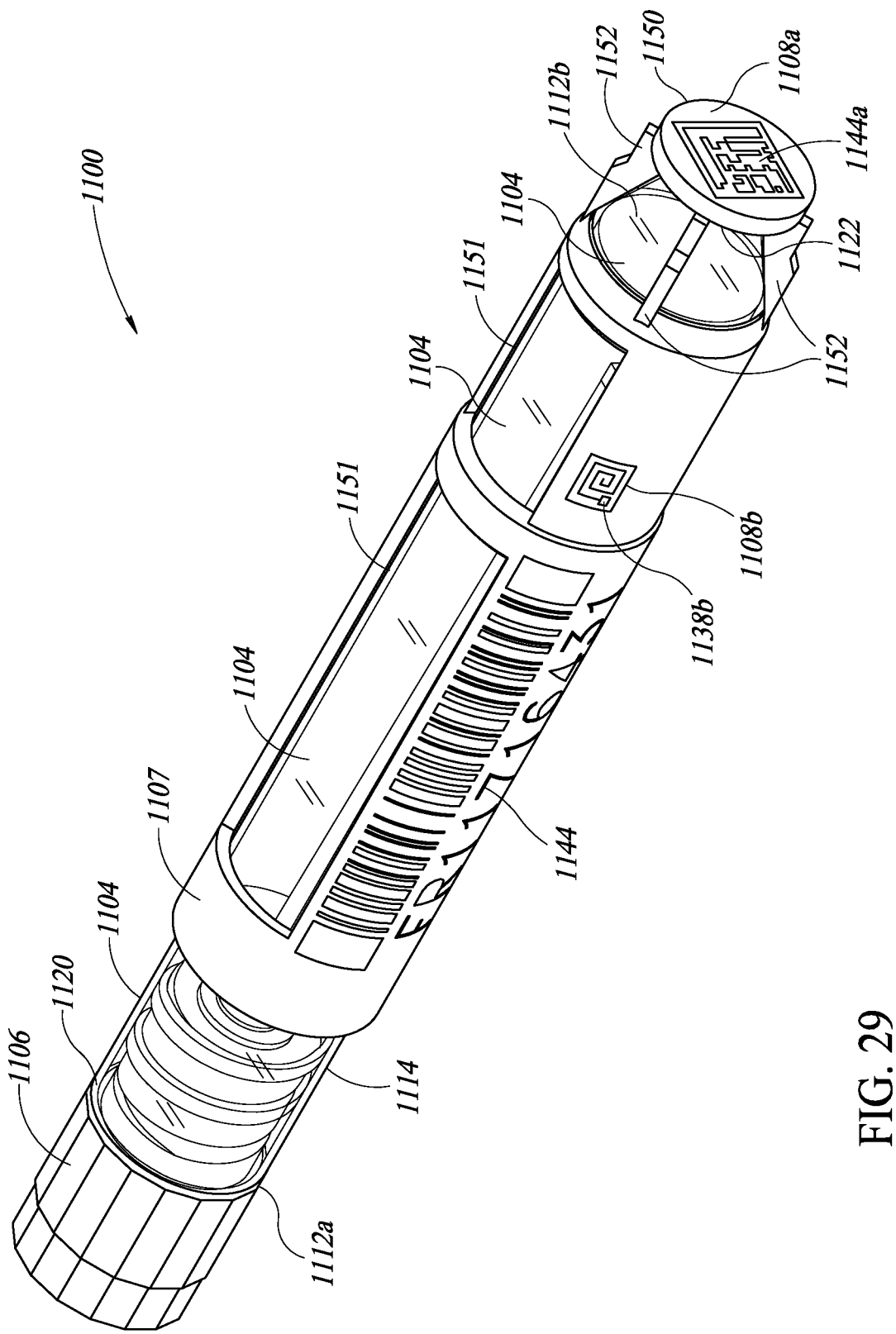
FIG. 29 is an isometric view of a container for holding biological samples, the container including a vial and a cap, the vial being at least partially covered by an outer jacket or sleeve, according to at least one implementation.

FIG. 29 is an isometric view of a container 1100 for holding biological samples, the container including a 1104 vial and a 1106 cap, the vial 1104 being at least partially covered by an outer jacket 1107, also called an outer sleeve or frame, according to at least one implementation. The cap 1106 is sized and shaped to removably close the opening 1120 at the first end 1112a of the vial 1104. The vial 1104 has a first end 1112a, a second end 1112b, and a side wall 1114. The second end 1112b is opposed from the first end 1112a across a length of the vial 1104, and the side wall 1114 extends between the first and the second ends 1112a, 1112b to delimit an interior of the vial 1104 from an exterior thereof. The vial 1104 has an opening 1120 at the first end 1112a thereof, and the second end 1112b may be closed or sealable. The vial 1104 takes the form of a tube, which may have a circular profile or cross section, or alternatively may have other shapes (e.g., rectangular, hexagonal, octagonal). The opening 1120 of the vial 1104 may, for example, be circular, although the opening 1120 may have other shapes. The second end 1112b of the vial 1104 may, for example, terminate in a semi-spherical tip or may be frustoconical, terminating in a flat surface 1122 which is perpendicular to the longitudinal axis of the vial 1104.

Figure 30:
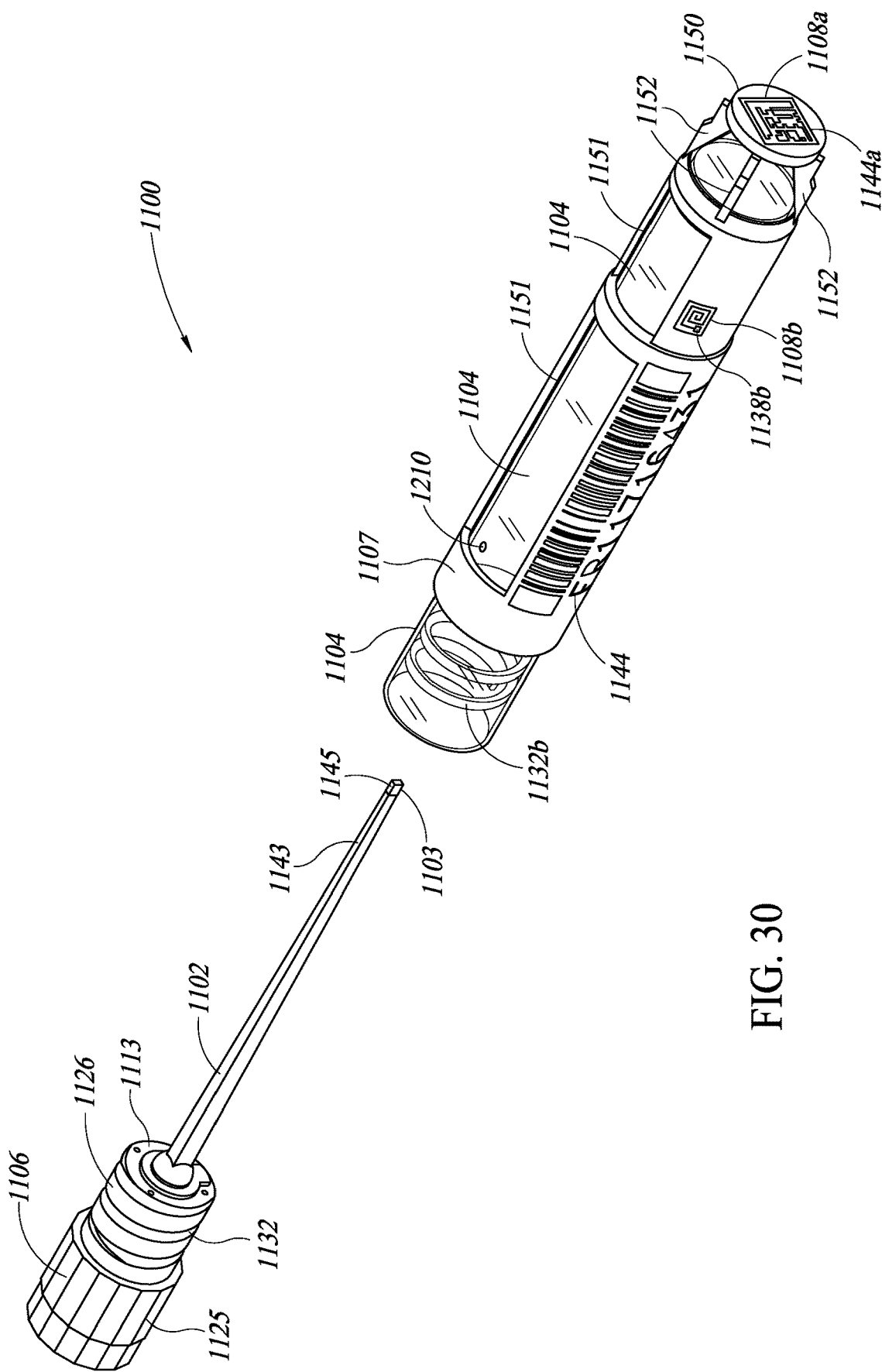
FIG. 30 is an isometric view of the container of FIG. 29 with the cap removed therefrom, with an elongate specimen holder extending from the cap as an integral, permanently fixed, or removably-attached element, according to at least one implementation.
Figure 31:
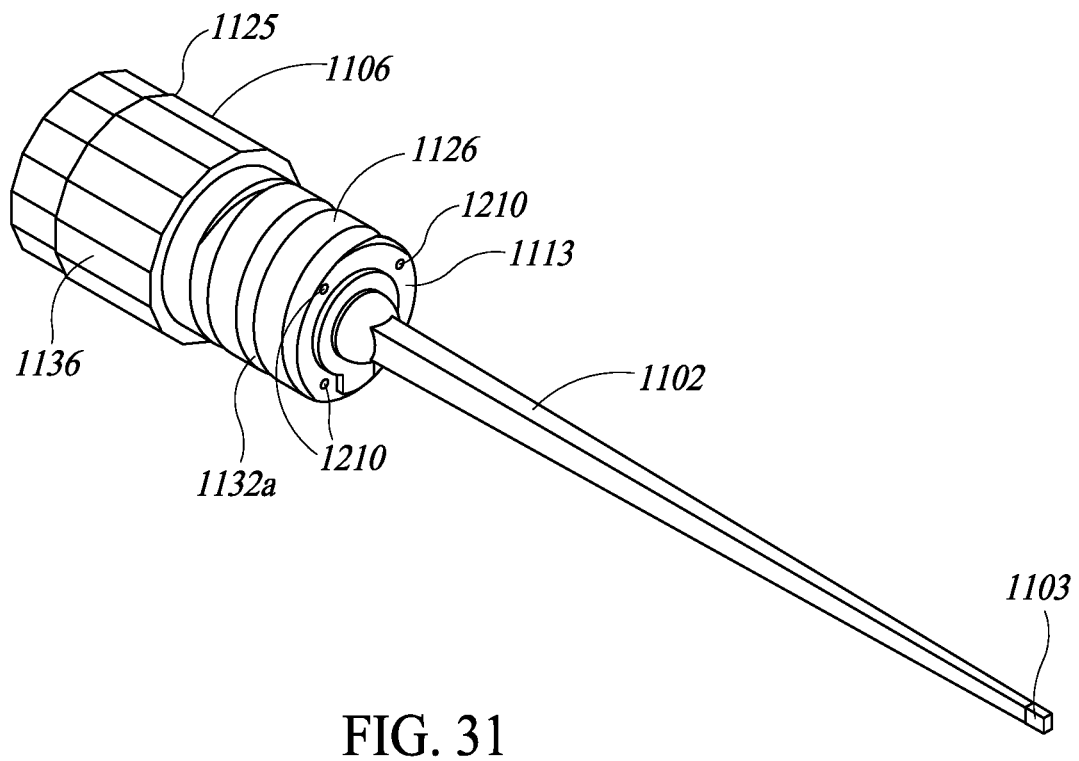
FIG. 31 is an isometric view of the cap of the vial of FIG. 30 with a specimen holder fixed to a bottom surface of the cap, according to at least one implementation.

FIG. 30 is an isometric view of the container with the cap 1106 removed therefrom, with an elongate specimen holder 1102 extending from the cap 1106 as an integral, permanently fixed, or removably-attached element, according to at least one implementation. The elongate specimen holder 1102 may have a generally solid form having no through passage (e.g., a stick, spatula, sampling rod). The elongate specimen holder 1102 may extend from a bottom surface 1113, i.e., interior-facing surface, of the cap. FIG. 31 is an isometric view of the cap 1106 showing the specimen holder 1102 fixed to bottom surface 1113 of the cap 1106, according to at least one implementation. The specimen holder 1102 may be fixed to bottom surface 1113 of the cap 1106 in any of a variety of ways. For example, the specimen holder 1102 and the cap 1106 may take the form of a single, unitary piece structure or construction, for instance molded as a single unitary and optionally monolithic part. Also for example, the specimen holder 1102 may be interference or friction fitted in an aperture in the bottom surface 1113 of the cap 1106. Also for example, the specimen holder 1102 may be adhered to the bottom surface 1113 of the cap 1106.

Figures 32, 33:
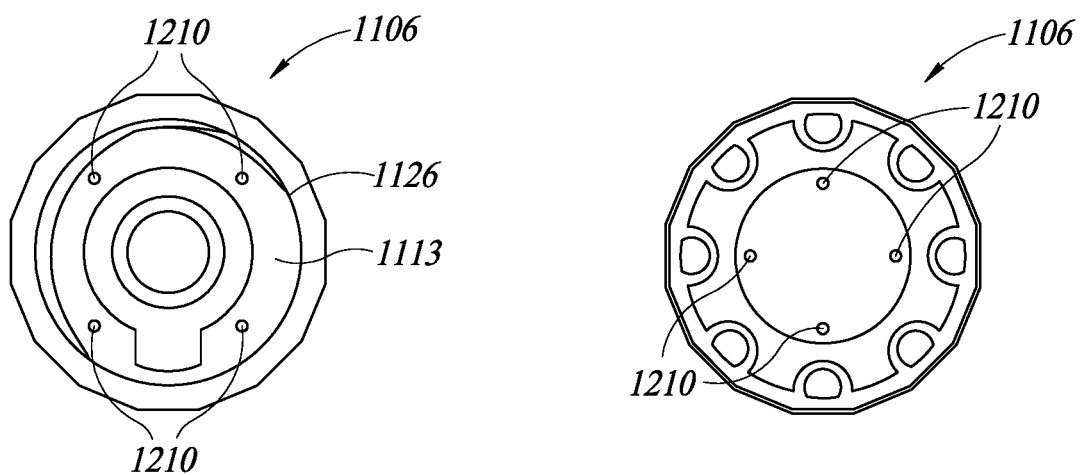
FIGS. 32 and 33 are a bottom view and a top view, respectively, of the cap of the vial of FIG. 30 without an attached specimen holder, according to at least one implementation.

FIGS. 32 and 33 are a bottom view and a top view, respectively, of the cap 1106 without an attached specimen holder 1102, according to at least one implementation.

The specimen holder 1102 has a distal end to carry a specimen 1103, such as biological materials and/or samples (e.g., eggs, sperm, and zygotes), and a proximate end which is attached to, or integral with, the cap 1106. In implementations, the specimen holder 1102 and the cap 1106 may be a single, unitary structure, and the specimen holder 1102 may include a spatula 1143 having a flat surface 1145 at the distal end of the specimen holder 1102, with the specimen 1103 being frozen to the flat surface 1145.

The cap 1106 may have a top portion 1125 and a side wall 1126 extending from the top portion 1125, the side wall 1126 delimiting a portion of the cap 1106 which is smaller in extent relative to the top portion 1125 in a direction transverse to the longitudinal axis of the vial 1104 so that the side wall 1126 can be inserted into the interior of the vial 1104, the top portion 1125 acting as a stopper to limit the depth of insertion of the side wall 1126 into the vial 1104. The cap 1106 may have threads 1132a, for example on an outer surface of the side wall 1126 to mate with corresponding threads 1132b on an inner surface of the side wall 1114 of the vial 1104.

Figure 35:
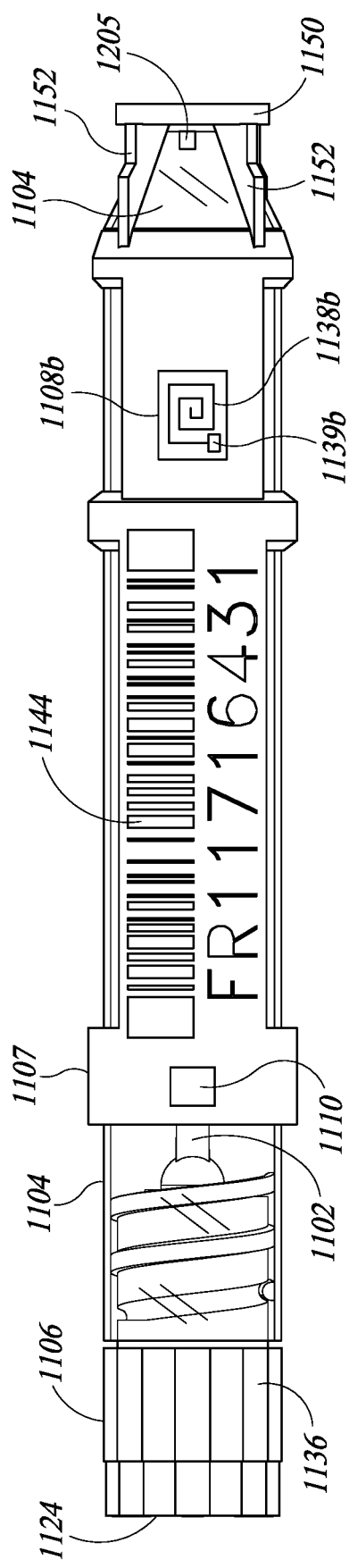
FIG. 35 is a side view of the container of FIG. 29 showing a label fixed to the side of the outer jacket of the container, the label including a machine-readable symbol(s) and human-readable information and covering or being positioned near a second wireless transponder, according to at least one implementation.

Implementations may advantageously include a number of ports 1205 and/or vents 1210 (see FIGS. 33 and 35). The ports 1205 advantageously allow ingress of liquid (e.g., liquid nitrogen) into an interior of the vial 1104 while the cap 1106 is in place on the vial 1104, while the vents allow gas (e.g., air) to escape from the interior of the vial 1104 as liquid enters the vial 1104 while the cap 1106 is in place on the vial 1104. The ports 1205 may be located in the vial 1104 (one visible in FIG. 35), in the cap 1106, or in both the vial 1104 and the cap 1106. The vents 1210 may be located in the cap 1106 (four shown in FIGS. 30-33), in the vial 1104 (one shown in FIG. 30), or in both the cap 1106 and the vial 1104. The ports 1205 and vents 1210 provide ingress and egress between the interior of the vial 1104 and the exterior while the cap 1106 is secured to the vial 1104. Preferably, the vents 1210 are located toward the top (e.g., in the cap or at least proximate the top of the vial), while the ports 1205 are positioned toward the bottom (e.g., at least proximate the bottom of the vial), which allows liquid to leach in from the bottom of the container 1100 and gas to vent out from the top as the container 100 is lowered into a cryogenic bath, e.g., in a dewar.

Although the term "vent" has been used herein to describe through-holes (which are not necessarily round), which allow gas (e.g., air) to escape the vial 1104 and the term "port" has been used to describe through-holes which allow liquid nitrogen into the vial 1104, these terms are interchangeable in some cases. For example, the structure of the through-holes used for the vents 1210 and ports 1205 may be simple apertures and therefore may function primarily as vents 1210 or ports 1205 depending on their position relative to the top and bottom of the container 1100 and depending on operational conditions (e.g., depending on whether a container 1100 is being lowered into or raised out of a cryogenic bath). In some implementations, the ports 1205 and vents 1210 may include valves, flaps, screens, filters, or other structures, to restrict the flow of gas or liquid to a specific direction vis-à-vis the interior of the vial 1104 and this may result in structures which act as dedicated ports 1205 or vents 1210. In some cases, the outer jacket 1107 (discussed below) may include through-holes in correspondence with the through-holes in the vial 1104 to facilitate ingress and egress of liquid and/or air.

The cap 1106 may be formed of any of a variety of materials, for example polymers, for instance thermoplastics, such as polypropylene or polyethylene, and/or any other suitable material that withstand temperatures common in cryogenic applications without significant degradation. An outer surface of the top portion 1125 of the cap 1106 may include a plurality of facets 1136 to facilitate gripping when tightening or loosening the cap 1106. While the cap 1106 is generally illustrated as having a portion thereof securely received within the opening of the vial 1104, in some implementations, the cap 1106 may alternatively be sized to receive a portion of the vial 1104 within an opening in the cap 1106, as in the example of FIG. 1.

The container includes an outer jacket 1107 covering at least a portion of an exterior surface of the vial (see FIGS. 29, 30, and 35). The outer jacket 1107 is shaped and sized to allow the vial 1104 to be received within a top opening of the jacket 1107. Both the vial 1104 and the outer jacket 1107 may have, for example, a circular cross-section such that the circumference of an exterior surface of the vial 1104 is approximately equal to a circumference of an inner surface of the jacket 1107. Such a configuration allows for a snug fit between the vial 1104 and the outer jacket 1107. In implementations, the second end 1112b of the vial 1104, e.g., the frustoconical tip which terminates in a flat surface 1122, may extend from a bottom opening of the jacket 1107.

The inner surface of the jacket 1107 may be attached to the exterior surface of the vial, e.g., friction fitted, heat fitted, and/or via adhesive, in implementations in which the outer jacket 1107 is to remain associated with the particular vial throughout the lifecycle of the container 1100. In some implementations, the inner surface of the jacket 1107 may be removably attached to the exterior surface of the vial 1104 to allow removal and replacement of the outer jacket 1107, e.g., if the outer jacket 1107 is to be associated with more than one vial 1104 (or vice versa). In such a case, there may be an elastic compression fit and/or a friction fit between the vial 1104 and the outer jacket 1107. In implementations, the inner surface of the jacket 1107 and/or the exterior surface of the vial 1104 may include deformable protrusions (not shown) which compress elastically to form a compression fit between the vial 1104 and the outer jacket 1107. In implementations, the inner surface of the jacket 1107 and/or the exterior surface of the vial 1104 may include opposing threads or ridges to secure the vial 1104 within the outer jacket 1107 (or, in other words, to secure the outer jacket to the vial). In implementations, outer jackets 1107 may be manufactured separately from vials 1100 and, for example, retrofitted onto existing vials 1104.

The outer jacket 1107 may have openings 1151 (see FIGS. 29 and 30) through which the exterior surface of the vial 1104 is visible, thereby allowing the contents of the vial 1104 to be seen in implementations in which the vial 1104 is transparent or translucent. The openings 1151 may have longer sides which run in a direction along the longitudinal axis of the outer jacket 1107 and shorter sides which run in a direction transverse to the longitudinal axis of the outer jacket 1107 and curve around the circumference of the vial.

In implementations, an arrangement of arms 1152 may extend from the bottom opening of the jacket 1107 in a longitudinal direction of the outer jacket 1107 to support a platform 1150, e.g., a solid, disk-shaped platform, which is oriented in a plane which is transverse to the longitudinal axis of the outer jacket 1107 (see FIGS. 29, 30, and 35). For example, there may be four arms 1152 at positions which are 90 degrees apart around the circumference of the outer jacket 1107. The arms 1152 and the platform 1150 may be positioned and sized so that an inner surface of the platform 1150 forms a bottom interior surface of the jacket 1107. The bottom interior surface of the jacket 1107 may be in contact with, or nearly in contact with, the bottom portion of the vial 1104 when the vial is received in the outer jacket 1107. The platform 1150 may be attached to the ends of the arms 1152 or may be integrally formed with the arms 1152, such as, for example, in a thermoplastic manufacturing process.

The container 1100 may include one or more wireless transponders 1108a, 1108b, 1108c (collectively 1108). As discussed above in the context of FIG. 1, wireless transponders 1108 may take a variety of forms, such as, for example, active, passive, or battery-assisted radio frequency identification (RFID) transponders and/or micro-electro-mechanical systems (MEMS) transponders. Each of the wireless transponders 1108 may encode a unique identifier and may respond to wireless interrogation signals with response signals encoding the unique identifiers, for example via backscattering. In some implementations, all of the wireless transponders 1108 associated with a particular container 1100 may encode the same identifier as one another, the identifier uniquely identifying the container 1100. Alternatively, a nontransitory processor-readable medium may store a relationship between unique identifiers corresponding to wireless transponders 1108 associated with the same respective container 1100. The wireless transponders 1108 are able to withstand cold temperatures (e.g., negative 150° C.; negative 196° C.) and continue to operate. The wireless transponders 1108 may take the form of passive wireless transponders, which rely on power from interrogation signals to provide responses, e.g., via backscattering.

Figure 34:
FIG. 34 is a bottom view of the container of FIG. 29 showing a first wireless transponder fixed on the platform at the bottom end of the outer jacket of the container, according to at least one implementation.

FIG. 34 is a bottom view of the container 1100 showing a first wireless transponder 1108a fixed on the platform 1150 at the bottom end of the outer jacket 1107 of the container 1100, according to at least one implementation. The first wireless transponder 1108a may be fixed on an outer surface of the platform 1150, the transponder 1108a including, e.g., a first antenna 1138a (e.g., a microstrip or printed antenna, such as a patch antenna, coil antenna, spiral antenna, Planar Inverted F-Antenna, etc.) which is coupled to a respective transponder circuit 1139a (e.g., a radio, transmitter, backscatter circuit, as shown in FIG. 4). The first antenna 1138a typically has a beam axis aligned with a main lobe of a radiation plot of the first antenna 1138a, which would be in a direction parallel to the longitudinal axis of the outer jacket 1107.

In implementations, at least a portion of the platform 1150 itself may, for example, take the form of a radio frequency identification (RFID) button cell (see, e.g., FIG. 4) which is attached to the arrangement of arms 1152 and which serves as the first wireless transponder 1108a. In some cases, a portion of the platform, e.g., a thin disk-like plate of a thickness less than that of the platform 1150 discussed above, may be attached to the arrangement of arms 1152 and have an RFID button cell mounted thereon. In either of these configurations, i.e., the transponder being fixed on the platform or at least a portion of the platform itself being an RFID button cell, the first wireless transponder 1108a is fixed to the structure of the outer jacket 1107, as opposed to being received or positioned in a recess formed in the bottom of the vial 1104 or being otherwise directly fixed to the vial 1104.

In implementations, the circuitry of the first antenna 1138a, and possibly the transponder circuit 1139a, may be at least partially covered by a non-conductive label 1144a (see FIGS. 29 and 30) with machine-readable symbol(s) and/or human-readable information formed thereon so as to be visible on the bottom of the container 1100. In implementations, a label 1144a with a machine-readable symbol(s) formed thereon may be applied to the outer surface of the platform 1150 without a wireless transponder being present. The label 1144a may be at least partially covered at a later time by attachable wireless transponder circuitry, such as, for example, circuitry formed on a carrier having an adhesive backing or a carrier which is attachable using adhesive, e.g., epoxy. The epoxy may encapsulate the first wireless transponder 1108a, or the combination of the platform 1150 and epoxy may encapsulate the first wireless transponder 1108a, to securely attach and provide environmental protection thereto. Alternatively, the first wireless transponder 1108a may be molded or encapsulated in a portion of the platform 1150 itself.

FIG. 35 is a side view of the container 1100 showing a label 1144 fixed to the side of the outer jacket 1107 which may cover or be positioned near a second wireless transponder 1108b, according to at least one implementation. The second wireless transponder 1108b has a respective antenna 1138b (e.g., second antenna) which is coupled to a respective transponder circuit 1139b. The second antenna 1138b has a beam axis aligned with a main lobe of a radiation plot of the second antenna 1138b. The second wireless transponder 1108b is fixed to the outer jacket 1107 with the beam axis thereof extending perpendicularly to the beam axis of the first antenna 1138a. In implementations, the second wireless transponder 1108b may take the form of a radio frequency identification (RFID) tag. The RFID tag may have a flexible substrate or carrier which bears the second antenna 1138b and associated transponder circuit 1139b. The RFID tag may wrap at least partially around an outer perimeter of the outer jacket 1107. The second wireless transponder 1108b may be fixed to a portion of the outer jacket 1107, for example via an epoxy or other adhesive.

In implementations, the circuitry of the second antenna 1138b and transponder circuit 1139b may be at least partially covered by a label 1144 (e.g., a label formed of a non-conductive material) with machine-readable symbols and/or human-readable information formed thereon (e.g., of the sort discussed above with respect to FIG. 1) so as to be visible on the side of the container 1100, e.g., extending in a longitudinal direction of the container 1100. In implementations, a label with a machine-readable symbol(s) formed thereon may be fixed on the outer surface of the platform 1150 without a wireless transponder being present. The label may be at least partially covered at a later time by attachable wireless transponder circuitry, such as, for example, circuitry formed on a carrier having an adhesive backing or a carrier which is attachable using adhesive, e.g., epoxy.

Epoxy may encapsulate the second wireless transponder 1108b, or the combination of the jacket 1107 and the epoxy may encapsulate the second wireless transponder 1108b, to securely attach and provide environmental protection thereto. Alternatively, the second wireless transponder 1108b may be at least partially molded or encapsulated in a portion of the outer jacket 1107 itself.

In implementations, machine-readable symbol(s) may be fixed to other portions of the vial 1104, cap 1106, and/or outer jacket 1107, e.g., via epoxy. In at least some implementations, the machine-readable symbols may be integral to the wireless transponders 1108, e.g., printed, embossed, inscribed or otherwise applied thereto.

As discussed above, the first antenna 1138a may be fixed on an outer surface of the platform 1150 at the bottom end of the jacket 1107, in which case the beam axis of the first antenna 1138a of the first wireless transponder 1108a extends in a direction orthogonal to a plane of the platform 1105, which is in a direction along the longitudinal axis of the outer jacket 1107. As noted above, by providing the first and second wireless transponders 1108a, 1108b as separate and distinct substrates, the shape and features of the outer jacket 1107 may advantageously be employed to ensure that the beam axes are orthogonal to one another. Such an arrangement and positioning may facilitate interrogating or reading from below the vials, for example when held in storage in a cryogenic-cooled container.

Figure 36:
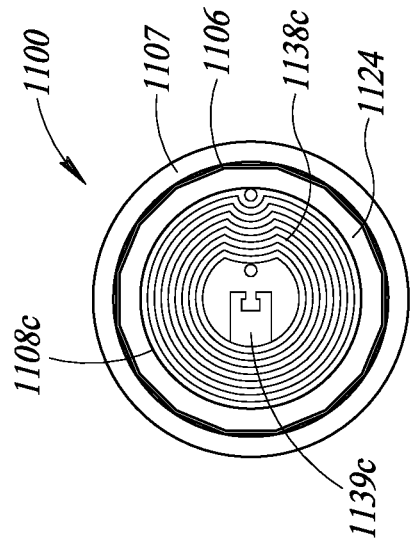
FIG. 36 is a top view of the container similar to that of FIG. 29 showing a wireless transponder fixed on a top surface of the cap of the vial, according to at least one implementation.

FIG. 36 is a top view of the container 1100 showing a third wireless transponder 1108c fixed on a top surface 1124 of the cap 1106, according to at least one implementation. The third wireless transponder 1108c may be fixed on an outer surface, e.g., the top surface 1124, of the cap 1106, the transponder including an antenna 1138c (e.g., a third antenna) which is coupled to a respective transponder circuit 1139c (e.g., a radio, transmitter, backscatter circuit, as shown in FIG. 4). The third antenna 1138c typically has a beam axis aligned with a main lobe of a radiation plot of the third antenna 1138c, which would be in a direction parallel to the longitudinal axis of the outer jacket 1107. The direction of the beam axis of the third antenna 1138c is aligned with that of the first antenna 1138a but points in a direction opposite to that of the beam axis of the first antenna 1138a, i.e., the beam axis of the third antenna 1138c points away from the top of the container 1100, whereas the beam axis of the first antenna 1138a points away from the bottom of the container 1100. In implementations, a radio frequency identification (RFID) button cell (see, e.g., FIG. 4) may be attached to a top surface 1124 of the cap 1106 to serve as the third wireless transponder 1108c. The third wireless transponder 1108c, as explained above, is fixed to the structure of the cap 1106, as opposed to being directly fixed to the vial 1104 or the outer jacket 1107. Hence, the cap 1106 is fixed to the specimen holder 1102. Therefore, the third wireless transponder 1108c (and its associated identifying information) remains associated with, i.e., communicatively coupled to, a specific specimen and this may result in operational advantages.

In implementations, the circuitry of the third antenna 1138c and the transponder circuit 1139c may be at least partially covered by a non-conductive label with a machine-readable symbol(s) formed thereon so as to be visible on the top of the container 1100. In implementations, a label (not shown) with a machine-readable symbol formed thereon may be applied to the outer surface (e.g., the top surface 1124) of the cap 1106 without a wireless transponder being present. The label may be at least partially covered at a later time by attachable wireless transponder circuitry, such as, for example, circuitry formed on a carrier having an adhesive backing or a carrier which is attachable using adhesive, e.g., epoxy. The epoxy may encapsulate the third wireless transponder 1108c, or the combination of the cap 1106 and the epoxy may encapsulate the third wireless transponder 1108c, to securely attach and provide environmental protection thereto. Alternatively, the third wireless transponder 1108c may be molded or encapsulated in a portion of the cap 1106 itself.

Physically attaching a wireless transponder to a portion of a cap may be particularly advantageous where the elongated specimen holder (e.g. spatula, stick, or straw) is fixed to the cap, either as a single unitary piece structure or via adhesive or a weld (e.g., high frequency or radio frequency welding, ultrasonic welding). In such implementations, a wireless transponder encoding unique identifying information (e.g., a unique identifier) may be undetachably or permanently physically coupled to the elongated specimen holder via the cap, and hence undetachably or permanently physically associated with a specimen, even where the elongated specimen holder and/or specimen are withdrawn from a vial.

The container 1100 may include or bear one or more sensors 1110 (see FIG. 35). As discussed above with respect to FIG. 1, the sensor(s) 1110 may take a variety of forms, such as, for example, wireless sensors which include an antenna and transponder circuit to wirelessly transmit measurements or other indications of sensed condition. The sensor(s) 1110 may be fixed to a portion of the vial 1104, cap 1106, and/or outer jacket 1107, e.g., via an epoxy or other adhesive. The epoxy may encapsulate the sensor(s) 1110, or the combination of the epoxy and the structure to which the sensor(s) 1110 are affixed may encapsulate the sensor(s)

1110, to securely attach and provide environmental protection thereto. In implementations, the sensor(s) 1110 may be molded or encapsulated in a portion of the vial 1104, cap 1106, and/or outer jacket 1107. The sensor(s) may be integral to the wireless transponders 1108 or may be separate and distinct from the wireless transponders 1108.

The various structures described herein may have dimensions conforming with a standardized format (e.g., American National Standards Institute (ANSI) format, Society for Biomolecular Screening (SBS) format, Society for Laboratory Automation and Screening format (SLAS), etc.). For example, in some embodiments, arrays of receptacles or other described structures can have a footprint that matches an SBS-format rack to facilitate use in an automated storage facility.

The various structures described herein may be comprised of any of a large variety of materials, although materials that would interfere with radio or microwave frequency communications will typically be avoided, or such materials spaced sufficient far (e.g., 3 mm) from antennas of wireless transponders and/or the anticipate location of interrogators or readers used to communicate with such wireless transponders. Further, the various structures described herein not only establish positioning or spacing in a two-dimensional plane (e.g., horizontal or XY plane), but also establish positioning or spacing in a third dimension (e.g., vertical or Z axis). At least some of the structures described herein support the containers 100 to ensure that a given location of the container (e.g., bottom surface with button coin RFID transponder) is spaced within a given distance or range (e.g., 20 mm; 15 mm) of an exterior of a carrier 200, 300, 400 and/or a location (i.e., interrogation station or reader station, e.g., located proximate a cryogenic cooler) at which an antenna of an interrogator or reader will be when the carrier 200, 300, 400 is placed at a reading location.

The various structures described herein as employing an aerogel may in some implementations consist of an aerogel. In other implementations, such structures may comprise an aerogel along with one or more other components. For example, some structures may employ a plastic (e.g., polypropylene) that is doped with an aerogel, which may advantageously enhance a dimensional stability of the structure. For instance, an array or cassette may include an aluminum bucket with an array of apertures sized and shaped to hold a plurality of containers, a top spacer of a plastic doped with aerogel with an array of apertures sized and shaped to hold a plurality of containers, and an outer sleeve of a plastic doped with aerogel that at least partially surrounds the aluminum bucket and top spacer.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; U.S. patent application 62/741,998, filed Oct. 5, 2018; and U.S. patent application Ser. No. 16/593,062, filed Oct. 4, 2019, are each incorporated herein by reference, in their entirety. These and other changes can be made to the embodiments in light of the above-detailed description.

Various changes can be made to the embodiments in light of the above-detailed description. For example, thermal insulators may consist of an aerogel or may comprise an aerogel and another non-aerogel thermal insulator (e.g., plastic). In some implementations, a thermal insulator may comprise an aerogel housed by a protective shell (e.g., plastic shell) or housing. One or more thermally insulative structures may additionally or alternatively be employed, for example one or more thermal breaks (e.g., walls defining cavities that a vacuum or near-vacuum, or holding an inert gas, or even a non-inert gas).

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. An apparatus to hold vials of biological materials and extend cryogenic conditions, the apparatus comprising:

a container having a top, a bottom, and at least one side wall, the bottom comprising a bottom wall having an inner facing surface and an outer facing surface, the at least one side wall having an inner facing surface and an outer facing surface, the inner facing surface of the bottom and the inner facing surface of the at least one side wall delineating an interior compartment having an interior compartment profile, the container having an opening at the top thereof, wherein the bottom of the container includes an array of a plurality of receptacles that extend upwardly from the inner facing surface, each of the receptacles having a dimension sized to receive a bottom portion of a respective vial therein;

a thermal shunt, the thermal shunt comprising a substrate comprising a metal and having a first major face and a second major face, the second major face opposed from the first major face across a thickness of the substrate, the substrate having an array of a plurality of throughholes that extend through the thickness of the substrate, each of the throughholes of the substrate shaped and sized to receive at least a portion of a respective vial therethrough, the substrate receivable in the interior compartment of the container;

a spacer receivable in the interior compartment of the container, the spacer having an array of a plurality of throughholes that extend therethrough, each of the throughholes of the spacer shaped and sized to receive at least a portion of a respective vial therethrough; and at least one thermal insulator receivable in the interior compartment of the container and that overlies the first major face and underlies the second major face of the substrate of the thermal shunt, the at least one thermal insulator having an array of a plurality of throughholes that extend therethrough, each of the throughholes of the at least one thermal insulator shaped and sized to receive at least a portion of a respective vial therethrough, and each of the throughholes of the spacer is axially aligned with a respective one of the at least one of the throughholes of the at least one thermal insulator; and wherein, when the spacer and the thermal shunt are stacked in the interior compartment of the container, each of the throughholes of the spacer is axially aligned with a respective one of the throughholes of the thermal shunt, a respective one of the plurality of throughholes of the thermal insulator, and a respective one of the receptacles, and when the spacer and the thermal shunt are stacked in the interior compartment of the container the second major face of the thermal shunt faces toward the inner facing surface of the bottom wall of the container such that a cavity is formed by each of the plurality of receptacles between the thermal shunt and the inner facing surface of the bottom wall, the cavity sized and configured to receive at least a portion of a respective vial therein such that the portion of the respective vial is positioned closer to the inner facing surface of the bottom wall than the second major face of the thermal shunt is from the inner facing surface of the bottom wall.

2. The apparatus of claim 1 wherein the vials each carry a respective wireless transponder, and a combination of the bottom of the container, the thermal shunt, and the spacer positions the vials longitudinally to space the wireless transponders relatively above or relatively below the thermal shunt by a defined distance.

3. The apparatus of claim 1 wherein the vials each carry a respective wireless transponder, and a combination of any of the bottom of the container, the thermal shunt, and the spacer positions the vials longitudinally to space the wireless transponders relatively above or relatively below the thermal shunt by a distance of at least 3 millimeters.

4. The apparatus of claim 3 wherein a combination of any of a thickness of the bottom of the container, the thermal shunt, and the spacer positions the vials longitudinally to space a bottom of the vials within a defined distance of an exterior surface of the bottom.

5. The apparatus of claim 3 wherein a combination of any of a thickness of the bottom of the container, the thermal shunt, the spacer positions the vials longitudinally to space a bottom of the vials within a distance of less than 20 mm from an exterior surface of the bottom of the container.

6. The apparatus of claim 1 wherein the vials each carry at least one specimen, the at least one specimen located in a defined region along a respective length of the vials, and the thermal shunt is positioned such that the defined region of each vial is laterally surrounded by the thermal shunt when the vial is positioned in a respective one of the throughholes of the thermal shunt.

7. The apparatus of claim 1 wherein the at least one thermal insulator comprises a thermal insulator tray and a thermal insulator plate, the substrate of the thermal shunt sandwiched between the thermal insulator tray and the thermal insulator plate.

8. The apparatus of claim 7 wherein the thermal insulator tray comprises an aerogel and the thermal insulator plate comprises an aerogel.

9. The apparatus of claim 1 wherein the at least one thermal insulator comprises a thermal insulator tray and a thermal insulator plate, the tray having a base having a periphery and a peripheral wall that extends from and about the periphery of the base, the base having an array of a plurality of throughholes, and the thermal insulator plate having an array of a plurality of throughholes, the throughholes of the thermal insulator tray axially aligned with respective throughholes of the thermal insulator plate and axially aligned with respective throughholes of the substrate of the thermal shunt.

10. The apparatus of claim 9 wherein the thermal insulator plate is receivable by the peripheral wall of the thermal insulator tray to enclose the thermal shunt on all sides thereof by a combination of the thermal insulator tray and the thermal insulator plate.

11. The apparatus of claim 1 wherein the substrate of the thermal shunt is a heat sink in the form of a block of non-ferrous metal.

12. The apparatus of claim 1 wherein the substrate of the thermal shunt is a heat sink in the form of a block of aluminum.

13. The apparatus of claim 1 wherein the substrate of the thermal shunt is a heat sink in the form of a block of non-ferrous metal impregnated polymer.

14. The apparatus of claim 1 wherein the throughholes of the spacer, the thermal shunt, the at least one thermal insulator are arranged in a 7 by 7 array.

15. The apparatus of claim 1 wherein the throughholes of the spacer, the thermal shunt, the at least one thermal insulator are each circular.

16. The apparatus of claim 1 wherein a combination of any of a thickness of the bottom of the container, the thermal shunt, and the spacer positions the vials longitudinally to space a bottom of the vials within a defined distance of an exterior surface of the bottom of the container.

17. The apparatus of claim 1 wherein a combination of any of a thickness of the bottom of the container, the thermal shunt, and the spacer positions the vials longitudinally to space a bottom of the vials within a distance of less than 20 mm or more preferably less than 15 mm of an exterior surface of the bottom of the container.

18. The apparatus of claim 1 wherein one or more portions of the apparatus comprises a plastic doped with an aerogel.

19. The apparatus of claim 1, further comprising:
a cover coupleable to the container to seal the opening in the top of the container while the spacer and the thermal shunt are stacked in the interior compartment of the container.

20. The apparatus of claim 1 wherein the at least one side wall of the container is a thermally insulated side wall, and the container further comprises a handle.

21. The apparatus of claim 1, further comprising at least one of:
a passive temperature sensor fixed to a portion of the container, the temperature sensor operable to provide a signal representative of a temperature in the interior compartment of the container;
a passive wireless transponder fixed to a portion of the container, the wireless transponder operable to withstand temperatures of approximately negative 150° C. and to subsequently or concurrently with being exposed to the temperature wirelessly transmit a unique identifier; and
a machine-readable symbol fixed to a portion of the container and which encodes a unique identifier.

22. The apparatus of claim 1 wherein the at least one side wall of the container includes at least two side walls, the two side walls opposed to each other across a lateral dimension of the container, each of the two side walls having a respective aperture sized to be gripped from an exterior of the container.

23. The apparatus of claim 1 wherein the bottom wall of the container includes a plurality of throughholes that extend therethrough to allow ingress and egress of liquid nitrogen into and out of the cavity when the container is placed in a bath of liquid nitrogen.

24. The apparatus of claim 1 wherein the at least one side wall of the container includes a first aperture and at least a second aperture opposed to the first aperture across a lateral dimension of the container.

25. The apparatus of claim 1 wherein the cavity is aligned with one of the plurality of throughholes of the substrate and one of the plurality of throughholes of the spacer.

26. The apparatus of claim 1, further comprising:
a vial positioned in the interior compartment of the container such that a first portion of the vial is received within one of the plurality of the throughholes of the thermal shunt, a second portion of the vial is received within the throughhole of the plurality of throughholes of the spacer that is axially aligned with the one of the plurality of the throughholes of the thermal shunt, and a third portion of the vial is received in the cavity such that the third portion is positioned closer to the inner facing surface of the bottom wall than the second major face of the thermal shunt is from the inner facing surface of the bottom wall.

* * * * *